(12) United States Patent
Cooper et al.

(10) Patent No.: US 8,175,918 B2
(45) Date of Patent: May 8, 2012

(54) SYSTEM AND METHOD FOR AUTOMATICALLY DETERMINING TRAVEL PRODUCT PRICE REBATES

(75) Inventors: Aaron Cooper, Chicago, IL (US); Craig Norwood, Chicago, IL (US); John V. Banta, Chicago, IL (US); David Gehrett, Chicago, IL (US); Sai Bhargava Kopakka, Chicago, IL (US); Douglas Charles Little, Elgin, IL (US); Prassad Naga Venkata Rudra Mutyala, Westmont, IL (US); Shweta Parekh, Forest Park, IL (US); Michael Uhl, Chicago, IL (US); Barry Wesley Waid, Berwyn, IL (US); Tracey Weinberg, Chicago, IL (US)

(73) Assignee: Orbitz Worldwide, L.L.C., Chicago, IL (US)

( * ) Notice: Subject to any disclaimer, the term of this patent is extended or adjusted under 35 U.S.C. 154(b) by 489 days.

(21) Appl. No.: 12/169,965

(22) Filed: Jul. 9, 2008

(65) Prior Publication Data
US 2010/0010841 A1    Jan. 14, 2010

(51) Int. Cl.
*G06Q 40/00* (2012.01)
(52) U.S. Cl. ..................................... 705/14.1
(58) Field of Classification Search ..................... 705/14
See application file for complete search history.

(56) References Cited

U.S. PATENT DOCUMENTS
2007/0033110 A1* 2/2007 Philipp et al. ................... 705/26
2007/0094056 A1* 4/2007 Kang et al. ....................... 705/5

OTHER PUBLICATIONS

Web page materials from www.aa.com website published by American Airlines at least as early as Jul. 8, 2008.
Web page materials from www.united.com website published by United Airlines, Inc. at least as early as Jul. 8, 2008.
Web page materials from www.continental.com website published by Continental Airlines, Inc. at least as early as Jul. 8, 2008.
Web page materials from www.nwa.com website published by Northwest Airlines at least as early as Jul. 8, 2008.
Web page materials from www.delta.com website published by Delta Air Lines, Inc. at least as early as Jul. 8, 2008.
Web page materials from www.expedia.com website published by Expedia, Inc. at least as early as Jul. 8, 2008.
Web page materials from www.travelocity.com website published by Travelocity at least as early as Jul. 8, 2008.
Web page materials from www.yapta.com website published by Yapta, Inc. at least as early as Jul. 8, 2008.
Web page materials from www.farecast.com website published by Farecast, Inc. at least as early as Jul. 8, 2008.

* cited by examiner

*Primary Examiner* — Hani M Kazimi
*Assistant Examiner* — Hatem M Ali
(74) *Attorney, Agent, or Firm* — Edwards Wildman Palmer LLP

(57) ABSTRACT

A computer-implemented system and method are provided for automatically determining rebate eligibility for purchased products. In one example, the purchased products may be travel-rebated products such as booked air travel itineraries. A database stores purchase information associated with purchased products purchased at corresponding purchase prices. A product administration system having a computer software-based product administration application interacts with the database and purchase information of a first purchased product is compared with purchase information of subsequently purchased products. The product administration application interacts with the database to determine if the first purchased a product matches a subsequently purchased product based on a set of matching criteria. The first purchased product may be eligible for a rebate if the product administration application determines that the subsequently purchased product was purchased at a lower purchase price than the purchase price for the first purchased product.

40 Claims, 16 Drawing Sheets

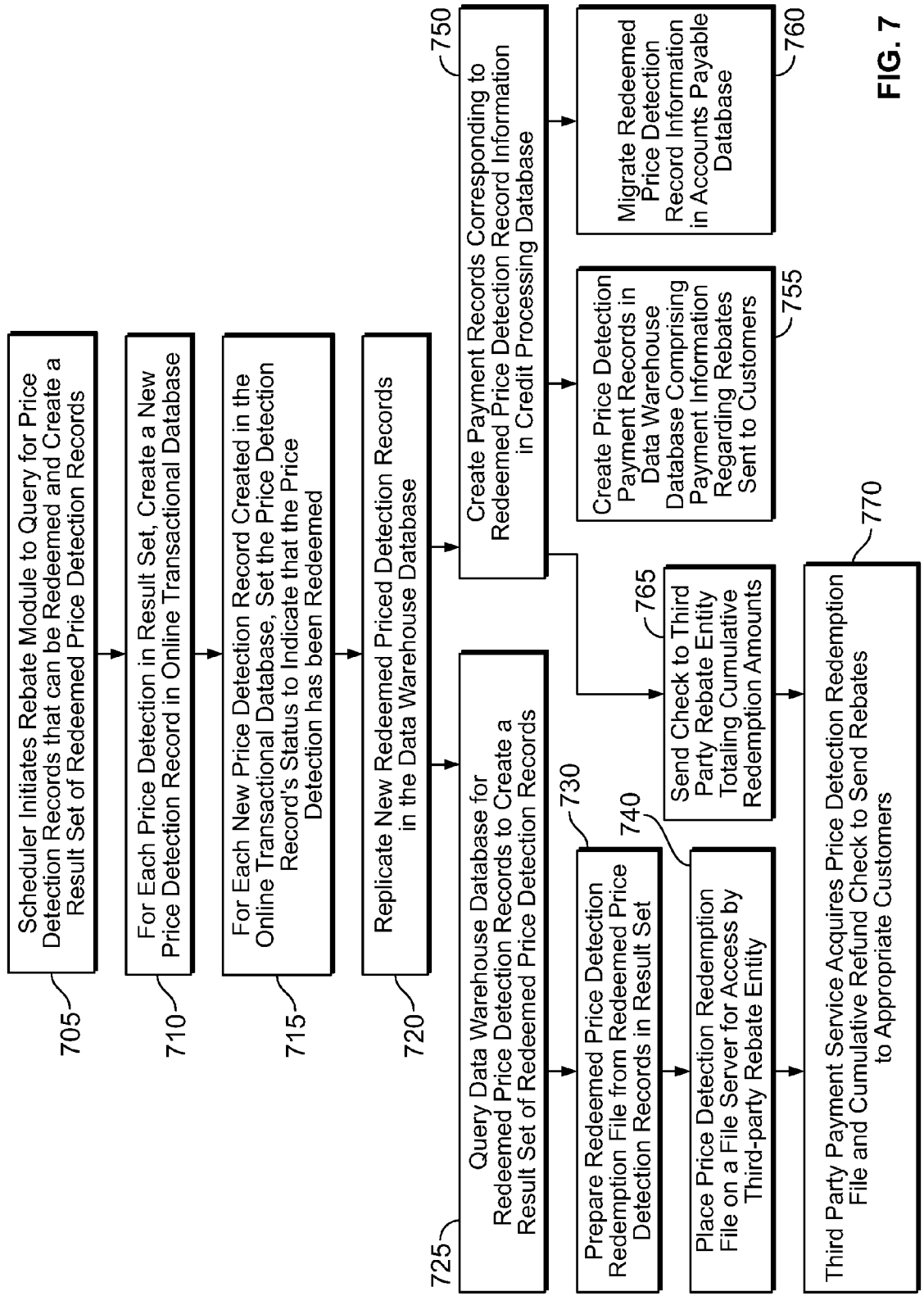

Flight Itinerary Table — 800

| Itinerary ID | Reservation Date | Cancelled Date | Itinerary Status | Locator Code | Email | Phone |
|---|---|---|---|---|---|---|
| AAAAA | 08/08/2008 | | Live | THX1138 | abc@123.com | 000-555-1234 |
| BBBBB | 06/07/2008 | | Live | 3263827 | def@456.com | 000-555-5678 |
| MMMMM | 05/25/2008 | | Live | 9262600 | ghi@789.com | 000-555-9012 |
| SSSSS | 02/24/2008 | | Live | 24601 | jkl@012.com | 000-555-3456 |
| VVVVV | 12/07/2008 | 12/10/2008 | Cancelled | 424242 | mno@345.com | 000-555-7890 |
| ZZZZZ | 12/25/2008 | | Live | MMA777 | pqr@678.com | 000-555-1357 |

FIG. 8A

Airfare Table — 820

| Airfare ID | Itinerary ID | Passenger Type | Number of Passengers | Base Fare | Tax | Total |
|---|---|---|---|---|---|---|
| AAAAA1 | AAAAA | REG | 1 | 500.00 | 31.26 | 531.26 |
| BBBBB1 | BBBBB | REG | 1 | 220.00 | 32.88 | 252.88 |
| MMMMM1 | MMMMM | CHILD | 2 | 333.00 | 34.24 | 367.24 |
| SSSSS1 | SSSSS | REG | 1 | 3500.00 | 267.95 | 3767.95 |
| VVVVV1 | VVVVV | REG | 1 | 775.00 | 75.50 | 850.50 |
| ZZZZZ1 | ZZZZZ | REG | 1 | 400.00 | 40.46 | 440.46 |

FIG. 8C

Flight Leg Table ⟵ 810

| Flight Leg ID | Itinerary ID | Sequence | Airline | Flight # | Departure Airport | Departure Date | Arrival Airport | Arrival Date | Cabin Type |
|---|---|---|---|---|---|---|---|---|---|
| 111 | AAAAA | 1 | Alpha | 0001 | APRT1 | 01/01/2009 12:00:00 | APRT2 | 01/01/2009 13:30:00 | Coach |
| 112 | AAAAA | 2 | Alpha | 0002 | APRT2 | 01/01/2009 14:30:00 | APRT3 | 01/01/2009 16:00:00 | Coach |
| 444 | BBBBB | 1 | Gamma | 0030 | APRT4 | 02/02/2009 8:30:00 | APRT5 | 02/02/2009 11:30:00 | First |
| 555 | MMMMM | 1 | Omicron | 0095 | APRT7 | 05/05/2009 17:45:00 | APRT8 | 05/05/2009 21:15:00 | Bus. |
| 222 | SSSSS | 1 | Lambda | 0224 | APRT5 | 02/02/2009 8:00:00 | APRT6 | 02/02/2009 12:30:00 | Bus. |
| 333 | VVVVV | 1 | Epsilon | 0102 | APRT9 | 03/03/2009 11:00:00 | APRT0 | 03/03/2009 15:30:00 | Bus. |
| 777 | ZZZZZ | 1 | Alpha | 0001 | APRT1 | 01/01/2009 12:00:00 | APRT2 | 01/01/2009 13:30:00 | Coach |
| 778 | ZZZZZ | 2 | Alpha | 0002 | APRT2 | 01/01/2009 14:30:00 | APRT3 | 01/01/2009 16:00:00 | Coach |

FIG. 8B

Staging Table 900

| Itinerary ID | Flight Leg ID | Sequence | Airline | Flight # | Departure Airport | Departure Date | Arrival Airport | Arrival Date | Cabin Type | Itinerary Status | Locator Code | Passenger Type | Base Fare | Total | Reservation Date |
|---|---|---|---|---|---|---|---|---|---|---|---|---|---|---|---|
| AAAAA | 111 | 1 | Alpha | 0001 | APRT1 | 01/01/2009 12:00:00 | APRT2 | 01/01/2009 13:30:00 | Coach | Live | THX1138 | REG | 500.00 | 531.26 | 08/08/2008 |
| AAAAA | 112 | 2 | Alpha | 0002 | APRT2 | 01/01/2009 14:30:00 | APRT3 | 01/01/2009 16:00:00 | Coach | Live | THX1138 | REG | 500.00 | 531.26 | 08/08/2008 |
| BBBBB | 444 | 1 | Gamma | 0030 | APRT4 | 02/02/2009 8:30:00 | APRT5 | 02/02/2009 11:30:00 | First | Live | 3263827 | REG | 220.00 | 252.88 | 06/07/2008 |
| MMMMM | 777 | 1 | Omicron | 0095 | APRT7 | 05/05/2009 17:45:00 | APRT8 | 05/05/2009 21:15:00 | Bus. | Live | 9262600 | CHILD | 333.00 | 367.24 | 05/25/2008 |
| ZZZZZ | 777 | 1 | Alpha | 0001 | APRT1 | 01/01/2009 12:00:00 | APRT2 | 01/01/2009 13:30:00 | Coach | Live | MMA777 | REG | 400.00 | 440.46 | 12/25/2008 |
| ZZZZZ | 778 | 2 | Alpha | 0002 | APRT2 | 01/01/2009 14:30:00 | APRT3 | 01/01/2009 16:00:00 | Coach | Live | MMA777 | REG | 400.00 | 440.46 | 12/25/2008 |
| SSSSS | 222 | 1 | Lambda | 0224 | APRT5 | 02/02/2009 8:00:00 | APRT6 | 02/02/2009 12:30:00 | Bus. | Live | 24601 | REG | 3500.00 | 3767.95 | 02/24/2008 |
| VVVVV | 333 | 1 | Epsilon | 0102 | APRT9 | 03/03/2009 11:00:00 | APRT0 | 03/03/2009 15:30:00 | Bus. | Cancelled | 424242 | REG | 775.00 | 850.50 | 12/07/2008 |

FIG. 9

Unique Flight Leg Table — 1000

| Unique ID | Flight # | Cabin Type | Departure Airport | Departure Date | Arrival Airport | Arrival Date |
|---|---|---|---|---|---|---|
| 72 | 0095 | Bus. | APRT7 | 05/05/2009 17:45:00 | APRT8 | 05/05/2009 21:15:00 |
| 75 | 0030 | First | APRT4 | 02/02/2009 8:30:00 | APRT5 | 02/02/2009 11:30:00 |
| 78 | 0001 | Coach | APRT1 | 01/01/2009 12:00:00 | APRT2 | 01/01/2009 13:30:00 |
| 81 | 0002 | Coach | APRT2 | 01/01/2009 14:30:00 | APRT3 | 01/01/2009 16:00:00 |
| 82 | 0002 | First | APRT2 | 01/01/2009 14:30:00 | APRT3 | 01/01/2009 16:00:00 |
| 90 | 0224 | Bus. | APRT5 | 02/02/2009 8:00:00 | APRT6 | 02/02/2009 12:30:00 |
| 91 | 0102 | Bus. | APRT9 | 03/03/2009 11:00:00 | APRT0 | 03/03/2009 15:30:00 |

FIG. 10

Itinerary Comparison Table — 1100

| Itinerary ID | Passenger Type | Route Code | Locator Code | Base Fare | Total | Reservation Date |
|---|---|---|---|---|---|---|
| AAAAA | REG | 78.81 | THX1138 | 500.00 | 531.26 | 08/08/2008 |
| ZZZZZ | REG | 78.81 | MMA777 | 400.00 | 440.46 | 12/25/2008 |
| BBBBB | REG | 75 | 3263827 | 220.00 | 252.88 | 06/07/2008 |
| MMMMM | CHILD | 72 | 9262600 | 333.00 | 367.24 | 05/25/2008 |
| SSSSS | REG | 90 | 24601 | 3500.00 | 3767.95 | 02/24/2008 |
| VVVVV | REG | 91 | 424242 | 775.00 | 850.50 | 12/07/2008 |

FIG. 11

Comparison Results Table 1200

| Previous Book Itinerary ID | Previous Book Airfare ID | Previous Book Loc. Code | Previous Book Pass Type | Previous Book Cabin Type | Previous Book Base Fare | Previous Book Total | Previous Book Depart Date | Subseq. Book Itinerary ID | Subseq. Book Airfare ID | Subseq. Book Loc. Code | Subseq. Book Pass. Type | Subseq. Book Cabin Type | Subseq. Book Base Fare | Subseq. Book Total |
|---|---|---|---|---|---|---|---|---|---|---|---|---|---|---|
| AAAAA | AAAAA1 | THX1138 | REG | Coach | 500.00 | 531.26 | 01/01/2009 12:00:00 | ZZZZZ | ZZZZZ1 | MMA777 | REG | Coach | 400.00 | 440.46 |
| SSSSS | SSSSS1 | 24601 | REG | First | 3500.00 | 3767.95 | 07/04/2009 10:00:00 | RRRRR | RRRRR1 | ROTJEP6 | REG | First | 3450.00 | 3717.95 |
| VVVVV | VVVVV1 | 424242 | REG | Bus | 775.00 | 850.50 | 03/03/2009 11:00:00 | UUUUU | UUUUU1 | TESBEP5 | REG | Bus | 675.00 | 750.50 |

FIG. 12

Price Detection Table 1300

| ID 1320 | Airfare ID 882 | Lower Airfare 1330 | Lowest Total Locator Code 1340 | Status 1350 | Status Date 1360 |
|---|---|---|---|---|---|
| 17 | AAAAA1 | 400.00 | MMA777 | D | 12/26/2008 |
| 18 | AAAAA1 | 400.00 | MMA777 | N | 12/26/2008 |
| 31 | AAAAA1 | 400.00 | MMA777 | R | 01/02/2009 |
| 22 | SSSSS1 | 3450.00 | ROTJEP6 | D | 02/24/2009 |
| 23 | SSSSS1 | 3450.00 | ROTJEP6 | N | 02/24/2009 |
| 37 | VVVVV1 | 675.00 | TESBEP5 | D | 12/08/2008 |
| 38 | VVVVV1 | 675.00 | TESBEP5 | E | 12/11/2008 |

FIG. 13

Price Detection Payment Table 1400

| ID 1420 | Price Protection ID 1430 | Previous Booking Locator Code 840A | Subsequent Booking Locator Code 840B | Payment Amount 1440 | Status 1350 | Status Date 1360 |
|---|---|---|---|---|---|---|
| 49 | 12 | LOTR09 | CONLVW | 250.00 | R | 08/26/2008 |
| 56 | 31 | THX1138 | MMA777 | 100.00 | R | 01/02/2009 |

ORBITZ A STEP AHEAD

Quick Search | Vacation Packages | Hotels | Flights | Cars & Rail | Cruises | Activities | Deals | MY STUFF My Trips | My Account | ORBITZ TLC  Home  Traveler Update  Customer Support

Price Assurance

MY STUFF
My Account
[Price Assurance]
Change e-mail settings
My profile
My Interests
Profiles of other travelers
Billing information
Shipping information
Change my password

My Trips

1630

| Current | History |

Be confident you're getting the lowest price on Orbitz
Once you book a flight on Orbitz, we immediately start tracking to see if another customer books the exact same itinerary at a lower price.

If that happens, we'll mail you a refund check approximately 30 days after departure. More on tracking and refunds

*All prices below are coach-class tickets, unless otherwise noted.*

$50 > Refund Earned - Expect to receive it by Mar 25, 2008!     Where we sent it

Fort Lauderdale Trip
Chicago (ORD) - New York (LGA)
Travel Dates: Feb 24, 2008 - Feb 29, 2008
Travelers: Mike Smith, Mary Caray ☑ Flight purchased
☑ Refund earned
☑ Departure flight flown

| Feb 10, 2008 | You paid $150.00 each for 2 Adult tickets |

| Feb 29, 2008 | Lower Adult price paid $125.00 | $50.00 rebate ($25.00 per person) |
| Feb 24, 2008 | Lower Adult price paid $130.00 | $40.00 rebate ($20.00 per person) |

1620

$50 > Refund Pending - We'll mail your refund after your departure

Fort Lauderdale Trip
Chicago (ORD) - New York (LGA)
Travel Dates: Mar 20, 2008 - Mar 25, 2008
Travelers: Mike Smith, Mary Caray ☑ Flight purchased
☑ Refund earned
☐ Departure flight flown

| Feb 10, 2008 | You paid $150.00 each for 2 Adult tickets |

| Feb 29, 2008 | Lower Adult price paid $125.00 | $50.00 rebate ($25.00 per person) |
| Feb 24, 2008 | Lower Adult price paid $130.00 | $40.00 rebate ($20.00 per person) |

1610

Tracking - You currently have the lowest price!

Anchorage Trip
Miami (MIA) - Anchorage (ANC)
Travel Dates: Jan 1, 2009 - Jan 31, 2009
Travelers: Mike Smith, Mary Caray ☑ Flight purchased
☐ Refund earned
☐ Departure flight flown

| Jan 10, 2008 | You paid $1,075 each for 2 Adult tickets |

SYSTEM AND METHOD FOR AUTOMATICALLY DETERMINING TRAVEL PRODUCT PRICE REBATES

FIELD OF THE INVENTION

The present invention relates to systems and methods for determining product rebates and in particular, to systems and methods that automatically process travel product rebates such as rebates for booked air travel itineraries.

BACKGROUND

Consumers face a variety of options when purchasing travel-related products. Consumers may reserve and purchase directly from the travel providers, may seek assistance in reservation and booking from a travel agency, or may search for and purchase travel-related products over the Internet from online booking services.

One example is airline tickets. No matter which approach customers choose when making their reservations and purchases, airfare prices can change frequently and unpredictably. Airlines often adjust their prices to respond to demand or changes in the marketplace. As a result, customers may be hesitant to finalize a purchase. The unpredictable fluctuations in prices can result in uncertainty regarding the best time to buy. Should customers purchase too early, they may miss out on subsequent lower prices. Should consumers wait too long to finalize a purchase, they may end up paying more, having failed to take advantage of previously lower priced airfares. Many airlines offer travel vouchers, travel credits, or cash rebates should a customer discover a lower priced airfare. Online travel booking services provide similar vouchers, credits, or rebates if customers discover subsequently lower priced airfares. However, the vouchers, credits, and rebates offered by airlines and online travel booking services typically come with time limits within which a customer must act to take advantage of the lower priced airfare. Additionally, consumers must initiate the process themselves to obtain these offers by applying (and at times paying) for such services, completing claim forms, and contacting customer service representatives.

A variety of approaches have been developed to address continuous price fluctuations in airfares. One approach uses predictive systems to make suggestions regarding the point at which a customer should make a final purchase. These predictive systems utilize technologies that analyze historic flight and fare data to predict whether prices may increase or decrease in the future. Based on these predictions, customers can finalize their purchases when they feel comfortable with the price. However, these predictive technologies do not adequately alleviate consumers' hesitations when purchasing tickets. While the consumer possesses more knowledge on which to base the decision to purchase, the risk still exists that prices will subsequently drop requiring customers to continue to monitor flights and airfares.

Another approach employs a system to provide customers with alerts regarding available airfares. Customers may use these systems to monitor airfares and make a purchase when they are alerted to a price they find acceptable. If the customer receives an alert, and the alert indicates the availability of a lower priced airfare after the purchase is made, the customer may attempt to contact an airline to seek a voucher, credit, or rebate. However, these price alert systems similarly fail to adequately address customers' fears and hesitations in making a final purchase as customers must still take extra steps when seeking to obtain lower priced airfares. After notification is made, customers must then contact the airlines where the purchase was made and attempt to acquire the lower priced airfares. Furthermore, in many instances, customers must act within the time period in which the lower priced airfare is available. Should the customer miss the alert, the customer may miss the opportunity to acquire the lower priced airfare if prices subsequently rise. In addition, these alert systems may require the customer to manually input the information necessary to set up flights to track. Because these systems rely on the customer to provide this information, the process is prone to manual error. Should a customer make a mistake in providing the information, the alert system may not monitor the appropriate flights, if at all.

Another approach allows a customer to secure, or "lock in," an airfare obtained from a search of flights and airfares. When a customer performs a search, an acceptable airfare may be presented. However, the customer may wish to defer a final purchase in case airfare prices subsequently drop. On the other hand, the customer may wish a final purchase had been made if airfare prices subsequently rise. This approach provides a service whereby a customer, for a fee, may secure an acceptable airfare for a predetermined number of days allowing the customer to defer a final purchase for that time period. If the customer decides to make a final purchase within that time period, and the purchased airfare is higher than the secured airfare, the service provides a rebate to the customer. This rebate amount does not depend upon the price of the airfare for the flight the customer ultimately chooses; instead the rebate amount depends upon the lowest possible fare the customer could have chosen on the day in which the customer finalizes the purchase. Thus, the rebate is equal to the difference between secured airfare and the lowest airfare available on the day on which the customer made the final purchase. However, these systems also do not address situations in which airfares drop after the date of purchase. Currently, these systems only secure a price up until the date the ticket is purchased. They do not address prices after a purchase has been made.

Because these approaches may be time consuming, may require additional steps to obtain rebates, and may be prone to error, customers may choose to forego these options. Thus, a need exists to improve the process of providing customers with the ability to automatically receive rebates for product purchases and to provide assurance that purchases made will be at a cost not higher than a subsequently made purchase for the same product.

BRIEF DESCRIPTION OF THE DRAWINGS

FIG. 7 is a flowchart of an example payment process.

FIG. 8A illustrates an example of a flight itinerary table.

FIG. 8B illustrates an example of a flight leg table.

FIG. 8C illustrates an example of an airfare table.

FIG. 9 illustrates an example product comparison staging table depicting information used during the product comparison process.

FIG. 10 illustrates an example of a unique flight leg table.

FIG. 11 illustrates an example of an itinerary comparison table.

FIG. 12 illustrates an example of a product comparison results table depicting matching products with differing prices.

FIG. 13 illustrates an example of a price detection table.

FIG. 14 illustrates an example of a payment table.

FIG. 16 illustrates a webpage display of an example customer profile depicting travel product purchases and rebate status information.

DETAILED DESCRIPTION

Figure 1A:
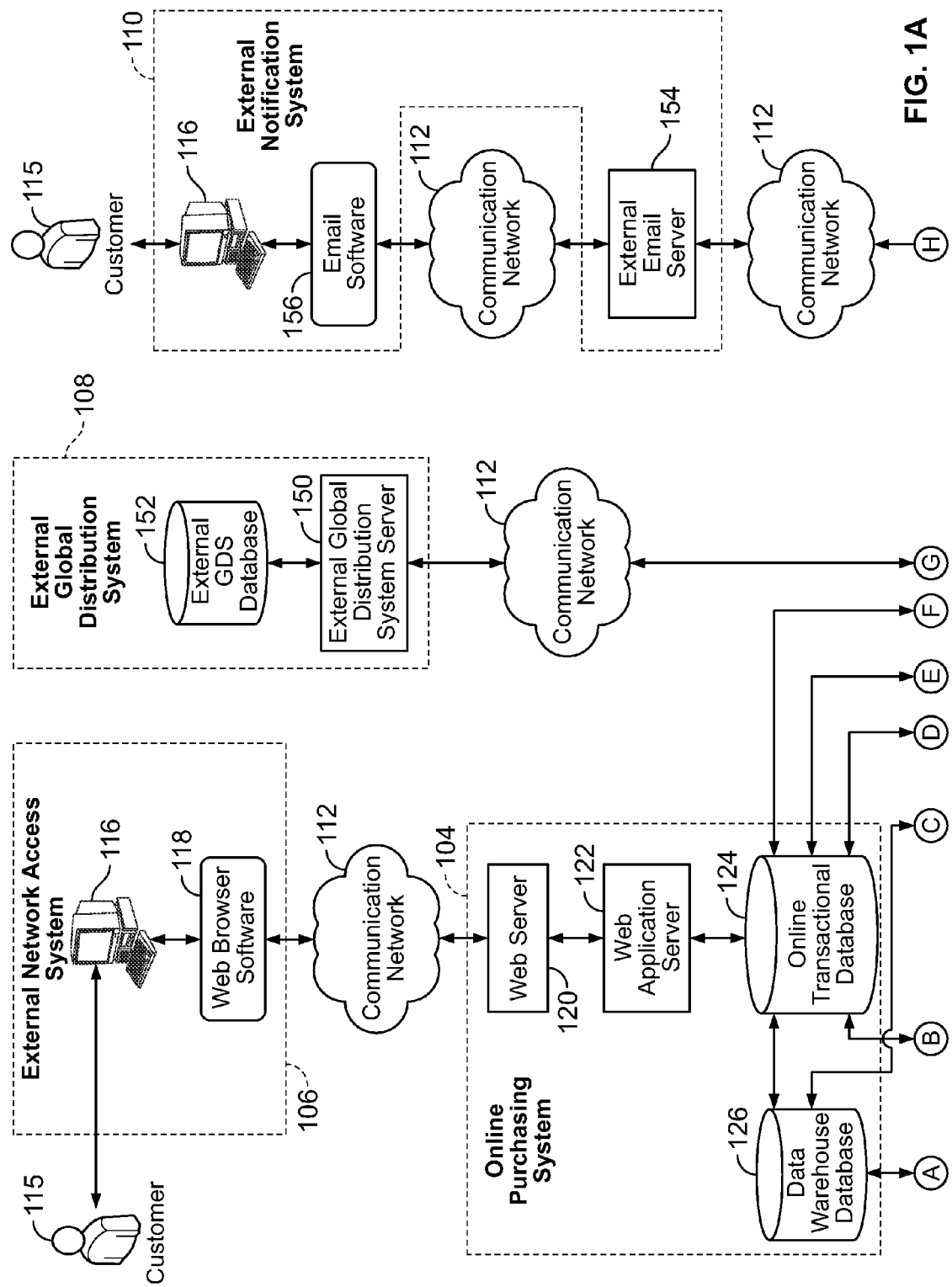
FIGS. 1A and 1B (collectively "FIG. 1") provide a diagram for an example configuration of a rebate processing system.

A computer-implemented system and method are provided for automatically determining rebate eligibility for purchased products. A database of an on-line purchasing system stores purchase information associated with purchased products that have been purchased at corresponding purchase prices. Purchase information is information relating to a particular product that has been purchased. A product administration system having a computer software-based product administration application is configured to interact with the database to compare purchase information associated with a purchased product to purchase information associated with subsequently purchased products in order to determine if the first purchased product may be eligible for a rebate. To determine eligibility, the software-based product administration application interacts with the database such that this information is compared to determine if the first purchased product matches a subsequently purchased product based on a set of matching criteria. The product administration application may further determine that the subsequently purchased product matching and was purchased at a lower purchase price than the purchase price for the first purchased product. The first purchased product may then be eligible for a rebate. A rebate amount is calculated from the price difference between the first purchase price for the first purchased product and the lower purchase price for the subsequently purchased product.

In the context of the present specification, "products" may encompass services as well as tangible goods. By way of example only, the present specification describes embodiments related to travel products, and in particular booked air travel itineraries. However, it is understood that the present invention may encompass and apply to various products and is intended to be covered by the appended claims and their equivalents.

As will be shown and described below, in particular, a system and method for automatically determining rebate eligibility for booked air travel itineraries are provided. A database stores booking information associated with a first booked air travel itinerary. If subsequently booked air travel itineraries (matching the first air travel itinerary) are booked by someone else at a lower airfare price, then the first booked air travel itinerary may be eligible for a rebate. As such, the database also stores booking information associated with subsequently booked air travel itineraries. Booking information, as used herein, is information relating to the booking of an air travel itinerary. The first booked air travel itinerary is booked at a first airfare price and the subsequently booked air travel itineraries have corresponding airfare prices.

In this example, a software-based product administration application of a product administration system is configured to interact with the database such that the booking information associated with the first air travel itinerary is compared with booking information associated with subsequently booked air travel itineraries that may have been booked by another party. The product administration application interacting with the database determines that the first air travel itinerary matches a subsequently booked air travel itinerary based on a set of matching criteria. The software-based product administration application is configured to determine that the subsequently booked air travel itinerary was booked at a lower airfare price than the airfare price for the first booked air travel itinerary.

The customer that booked the first air travel itinerary may be eligible for a rebate amount. The rebate amount, for example, may be calculated from the price difference between the first airfare price (of the first booked itinerary) and the lower airfare price associated with the matching subsequently booked air travel itinerary. An incentive is thus provided for a customer to immediately book an air travel itinerary. If an air travel itinerary that matches the air travel itinerary booked by the customer is later purchased at a lower airfare price by someone else, the customer may be eligible to receive a rebate for the difference in price. This provides assurance to customers that if they purchase now and a matching product (e.g. matching air travel itinerary) is subsequently purchased through the system by someone else at a lower price, the customer may be rebated the price difference—thereby reassuring the customer that the purchase will be made at or near a lowest subsequently purchased price for a matching product. Identifying the matching products and processing rebate amounts are done automatically as well.

As seen herein, the product administration system may interact with the database to compare select booking information of a booked air travel itinerary to booking information of subsequently booked air travel itineraries at repeated periodic intervals until a predetermined event occurs, such as a departure date for the booked air travel itinerary being reviewed for rebate eligibility. The set of matching criteria used in determining whether booked air travel itineraries match may selectively include various types of information relating to an air travel itinerary, such as airline data, departure date and time data, departure airport data, cabin class data, passenger type data, arrival date and time data, and arrival airport data. In comparing booked air travel itineraries for matching ones, booking information associated with the booked air travel itineraries may be collected in a staging table of the database. In response to the product administration application determining that an air travel itinerary matches a subsequently booked air travel itinerary, a database result set may be provided, with elements of the database result set stored in tables of the database.

The product administration application performs checks to confirm current information is being analyzed to determine rebate eligibility. As seen, product administration application synchronizes booking information stored in the database with corresponding booking information stored in an external system, such as a global distribution system, whereby the booking information stored in the database is updated to match the corresponding booking information of the external system. Additionally, the product administration system, in some instances, may determine that a booked air travel itinerary has been cancelled by a customer and render that air travel itinerary ineligible for a rebate in response to determining that the air travel itinerary was cancelled by the customer. Product administration system may also apply computer-implemented business rules to establish rebate eligibility. The computer-implemented rules, for instance, may be applied to include and exclude instances of where a booked air travel itinerary matches a subsequently booked air travel itinerary to establish rebate eligibility.

Figure 1B:
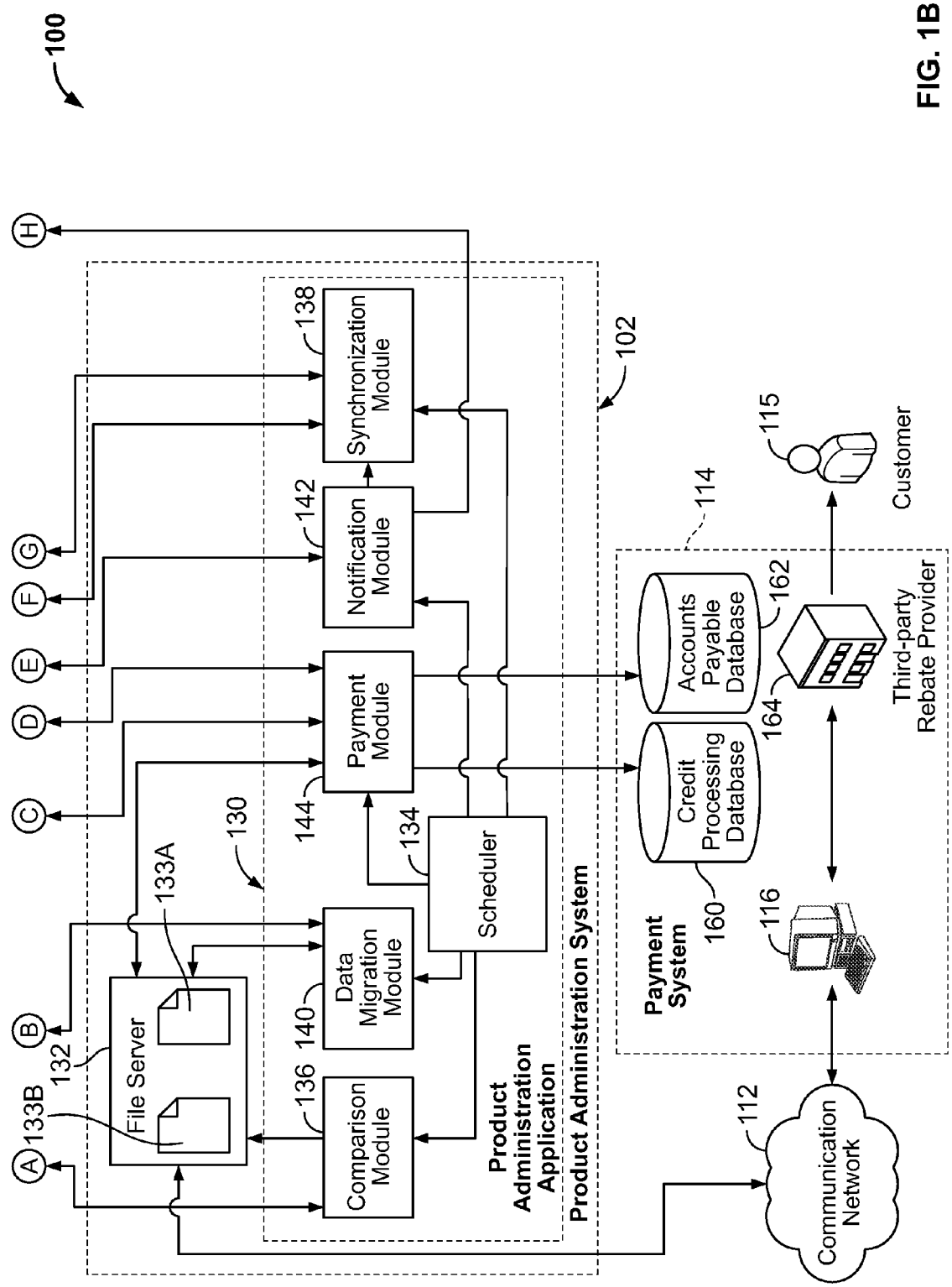

Referring to FIG. 1, computer-implemented rebate processing system 100 is shown. In this example, rebate processing system 100 includes product administration system 102, online purchasing system 104, external network access system 106, external global distribution system (GDS) 108, external notification system 110, and payment system 114. Product administration system 102 monitors online purchases of products. Product administration system 102, in the embodiment of FIG. 1, monitors online purchases of travel related products, and, in particular, monitors air travel bookings. Online purchasing system 104 allows users to search for airfares and book air travel itineraries. External network access system 106 allows for online communication with other systems and communication devices through communications network 112. External GDS 108 may be accessed by product administration system 102 to synchronize external travel product purchase data, such as travel booking data, with data stored in online purchasing system 104. External notification system 110 provides notification messages. For instance, in one example, external notification system 110 may provide e-mail notification messages to customers indicating that a booking for the same flight itinerary with a lower priced airfare has been detected. Product administration system 102 may also be coupled with payment system 114 to provide customers with the payment of rebates for purchases of matching flight itineraries with lower priced airfares.

As seen in FIG. 1, external network access system 106 includes network-enabled devices 116 having web-browser software 118 for communication over communications network 112, such as the Internet. Network-enabled device 116 may include a standard computer, desk-top computer, laptop computer, personal-digital-assistant, wireless telephone device, or any other device capable of connecting to and communicating with a network. Network-enabled devices 116 may also be able to browse the Internet with Internet-accessible software, such as web-browser software 118.

Online purchasing system 104, in this example, includes web server 120, web application server 122, online transactional database 124, and data warehouse database 126. As is understood by those skilled in the art, the architecture for online purchasing system 104 may be embodied in many forms. For example, web server 120 and web application server 122 may be embodied in the same server machine or on different server machines. Similarly, online transactional database 124 and data warehouse database 126 may be embodied in a single database or multiple databases of varying platforms.

Online transactional database 124 and data warehouse database 126 employ tables used to store, among other information, data relating to product purchases, and in particular to air travel reservation bookings made by customers. Referring ahead to FIGS. 8A-8C, exemplary tables that may be used to store relevant information relating to air travel bookings at online transactional database 124 and data warehouse database 126 are provided. Information relating to air travel itineraries may be stored in flight itinerary table 800, FIG. 8A. Flight itinerary information is a type of booking information, which relates to details regarding a specific flight or specific series of flights of an air travel itinerary. Information relating to individual flight legs may be stored, for example, in flight leg table 810, FIG. 8B. Information relating to airfares for air travel itineraries may be stored, for example, in airfare table 820, FIG. 8C. Airfare information is also a type of booking information, which relates to details regarding the airfare of a booked air travel itinerary. Flight itinerary table 800, flight leg table 810, and airfare table 820 may be referred to as booking tables that store various types of booking information.

In one example, data from booking tables 800, 810, 820 (FIGS. 8A-8C) stored in online transactional database 124 may be replicated in data warehouse database 126 in similar booking tables in order to separate the data for use by different functions that may be used with the databases. Online transactional database 126 functions to respond to queries from web application server 122 in this example, whereas data warehouse database 126 functions to store data for processing, reporting, and analysis purposes, such as for price detection analyses. Replicating data in different locations allows the transactional functions to not impact and impair the processing, reporting, and analysis functions and allows the processing, reporting, and analysis functions to not impact and impair the transactional functions. It should be noted that the storage of data in multiple databases and replication of such data may not be performed in alternative embodiments. The configuration of online purchasing system 104 of course, may be designed as dictated by system preferences or requirements. Product administration system 102, for example, may selectively be designed to operate under a variety of online purchasing system configurations and database architectures, including those embodied in a single database or multiple databases of the same or differing platforms.

Product administration system 102, in this example, includes product administration application 130 and at least one file server 132. Product administration application 130 includes scheduler 134, comparison module 136, synchronization module 138, data migration module 140, notification module 142 and payment module 144. Product administration system 102 hosts product administration application 130 which controls modules 136, 138, 140, 142, 144 and initiates the price detection process, described with reference to FIG. 2. File server 132 stores various digital files 133 that may be accessed by product administration application 130 and payment system 114. It will be appreciated that file server 132 may reside on a separate server machine or the same server machine as product administration system 102. Additionally, the components of product administration application 130 may reside on a single server machine or alternatively be distributed over any number of server machines. Scheduler 134 of product administration application 130 is responsible for initiating modules 136, 138, 140, 142, 144 of product administration system 102 at intervals. The different modules 136, 138, 140, 142, 144 of product administration application 102 will be described in more detail below.

As seen herein, product administration system 102 monitors and detects for online purchase of matching products in which a subsequently purchased product is purchased at a lower price. The detection of a matching product being purchased at a lower price is referred to as a price detection. For example, with regards to air travel itinerary bookings, a price detection may occur upon product administration system 102 detecting a matching air travel itinerary that has been subsequently purchased at a lower priced airfare. Price detection information relates to information used to record an instance in which a first purchased product (such as a booked air travel itinerary) matched a subsequently purchased product and where the subsequently purchased product was purchased at a lower price than the first product. Price detection data, for example, may be stored as records in a price detection table 1300, FIG. 13, of online transactional database 124 of online purchasing system 104. Price detections may be determined, for example, by comparison module 136 of product administration system 102, which utilizes tables of data warehouse database 126. These tables may include, for example: staging table 900 (FIG. 9); unique flight leg table 1000 (FIG. 10); itinerary comparison table 1100 (FIG. 11); and comparison results table 1200 (FIG. 12). Online transactional database 124 stores records of price detections in price detection table 1300 (FIG. 13) in which product administration system 102 identifies a matching itinerary that was subsequently booked at a lower-priced airfare.

External GDS 108 manages travel product purchases, such as reservation bookings, and may provide access to travel product booking information across communication network 112. In this example, as seen in FIG. 1, external GDS 108 includes external GDS server 150 and GDS database 152. GDS 108 is a computerized reservation system that provides information on travel-related products such as airline travel, hotel rooms, rental cars and other travel products. In this example, GDS 108 provides available flight information and booking information regarding purchases of customers. GDS 108 may be used by airlines and travel agents to store booking information and also provide access to flight and booking information via a communication network. Product administration system 102 communicates with external GDS 108 over communication network 112 to retrieve current data in order to apply any changes to booking information stored in online transactional database 124 and data warehouse database 126 of online reservation system 104.

Notification system 110, in this example, includes external e-mail server 154 for providing e-mail communication with product administration system 102 through communication network 112. External notification system 110 may receive e-mail messages at network-enabled device 116 with installed e-mail software 156 from external e-mail server 154 over communications network 112. In this particular example, product administration system 102 utilizes e-mail technology to provide notifications to customers. However, alternative approaches to provide notifications to customers may also be performed in rebate processing system 100. Alternative embodiments may provide notifications through other technologies such as short text message service (SMS), instant messaging service (IMS), cellular telephone service, traditional landline telephone service, and regular mail service.

Payment system 114 may selectively include credit processing database 160 and accounts payable database 162. Credit processing database 160 may be used, for example, for accounts payable, accounts receivable, and general ledger processing. Rebate processing system 100 provides rebates to customers, and as such, information relating to such rebates may be stored in a price detection payment table 1400, FIG. 14. Information regarding rebate payments stored in price detection payment table 1400, may be stored in credit processing database 160 and an associated accounts payable database 162 for accounting purposes. File server 132 may be coupled with third-party rebate provider system 164 for processing of rebates that are sent to customers 115. For instance, third party rebate provider may utilize a network enabled device 116 of payment system 114 to connect to file server 132 in order to download information regarding payment of rebates that are to be sent to customers. Payment system 114 may be configured such that alternative approaches to providing rebates to customers may be made. For example, a rebate may come in any form to meet the requirements of a particular embodiment, such as credit to a customer account or credits received towards a future purchase.

Figure 2:
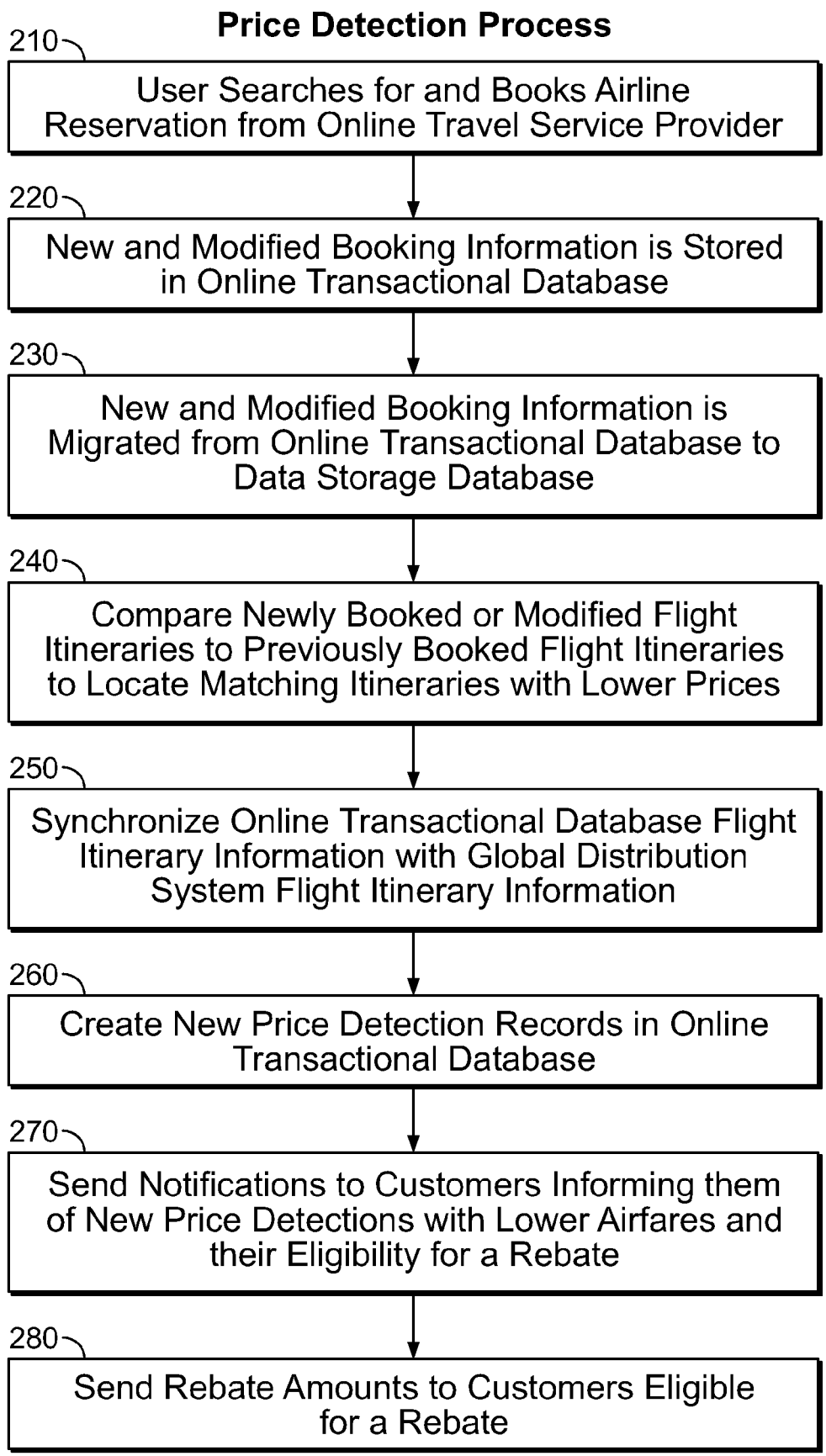
FIG. 2 is a flowchart of an example overall price detection process.

Referring now to FIG. 2, an example of the price detection process is illustrated. Price detection process begins at step 210 in which a customer 115 searches online for a product and purchases a product. For instance, the customer may search for air travel itineraries, select an airfare, and book a selected air travel itinerary using online purchasing system 104. In step 220, new and modified booking information is stored in online transactional database 124. A customer may, for example, select and book a particular itinerary for the first time. New booking information may refer to information relating to a purchase made for the first time in which information associated with this booking is stored in online transactional database 124 for the first time. Customers and airlines may also update existing booked purchases, for example if the airline changes a departure time, or the customer changes the departure date. Modified booking information may refer to information relating to a purchase previously made by a customer, which is subsequently changed. Once this new or modified booking information is stored at online transactional database 124, it may be migrated to data warehouse database 126 for replication in step 230. Once the booking information is stored at data warehouse database 126, product administration application 102 continues with the price detection process.

In step 240, product administration system 102 begins comparing new and modified bookings to existing bookings stored in data warehouse database 126 to locate matching flight itineraries in which a subsequently booked and matching itinerary has a lower priced airfare. The product comparison process is described further with reference to FIG. 3. In step 250, select booking information at online transactional database 124 is synchronized with corresponding booking information stored at external GDS data storage 152. Online transactional database 124 is updated with the most recent flight itinerary information (obtained from GDS data storage 152) to check that price detections are not applied to cancelled itineraries or itineraries that no longer match a lower priced itinerary. The synchronization process is described in further detail with reference to FIG. 4. In step 260, new price detection records 1310, FIG. 13, relating to bookings made at lower priced airfares are created in online transactional database 124. The data migration process identified in step 260 is described further with reference to FIG. 5. Notifications are sent to customers, in step 270, informing them of newly detected lower priced bookings and their eligibility to receive a rebate due to the lower-price detection. The notification process identified in step 270 is described in further detail with reference to FIG. 6. In step 280, the price detection records 1310, FIG. 13, are processed and the appropriate rebate amounts are sent to customers that are eligible to receive rebates. The payment process identified in step 280 is described in further detail with reference to FIG. 7.

With particular reference to steps 210, 220 of the price detection process, FIG. 2, a customer 115 uses network-enabled device 116 to connect to web server 120 of online purchasing system 104 via communication network 112. Web server 120 hosts the web pages for online purchasing system 104 and serves those web pages to the customer 115, which the customer may browse using web-browser software 118 on network-enabled device 116. The customer 115 may initially search for a travel product to purchase through online purchasing system 104. Using web-browser software 118, the customer 115 may, for example, submit airfare search requests to web server 120, which may include the destinations, dates, and time of travel. Web server 120 propagates these search requests to web application server 122, which then queries online transactional database 124 for air travel itineraries that match the search criteria inputted by the customer. Online transactional database 124 supplies web application server 122 with the results matching the search criteria inputted by the customer. Web application server 122 then provides these results to web server 120 for display within a web page. These web pages, displaying the search results for the searched travel product (e.g. air travel search results), are sent by web server 120 across communication network 112 to the web-browser software 118 on network-enabled device 116 for the customer.

Figure 15:
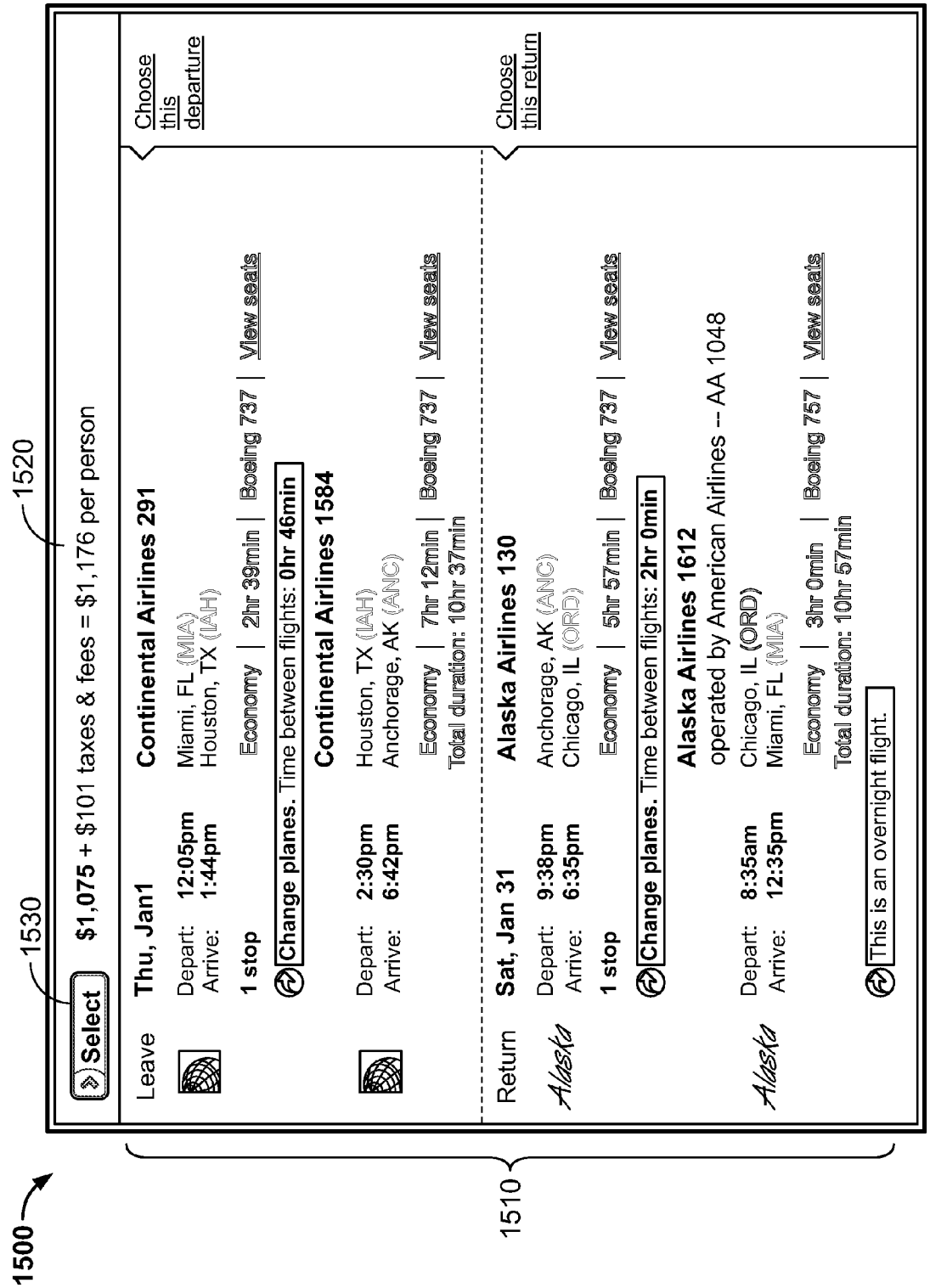
FIG. 15 illustrates an example webpage display of a flight itinerary as provided by an online travel product purchasing system.

Referring ahead briefly to FIG. 15, an example of a web page display 1500 of an air travel itinerary is provided. When a customer 115, interacting with online purchasing system 104 through network enabled device 116, locates a travel-related product to purchase, such as a particular air travel itinerary 1510 priced at an acceptable airfare 1520, the customer may use web-browser software 118 and actuate select button 1530 to submit a travel product purchase request (e.g. reservation request to book an itinerary). The reservation request to book a selected air travel itinerary 1510 may be transmitted across communication network 112 to web server 120. Web server 120, FIG. 1, propagates the reservation request to web application server 122. The reservation request may include information to book the particular air travel itinerary selected by the customer 115. Types of information to book a selected flight itinerary may include but is not limited to the departure cities, destination cities, dates and times of the reservation, the airfare price, as well as contact and billing information for the customer. Web application server 122 then creates new records in online transaction database 124 to store the different types of booking information.

It should be noted that online transactional database 124 may distribute booking information across as many database tables as needed to comply with the logical structuring of the data or as dictated by system preferences. Referring again to FIGS. 8A-8C, online transactional database 124, in this example, may distribute information received that relates to booked itineraries across flight itinerary table 800 (FIG. 8A), flight leg table 810 (FIG. 8B), and airfare table 820 (FIG. 8C) to store this information. Each booking creates a new record 830 in a flight itinerary table 800 (FIG. 8A), which stores information pertinent to air travel itineraries. For example, flight itinerary records 830 of flight itinerary table 800 may include but is not limited to a flight itinerary identifier 832, reservation date 834, cancellation date 836 (if the booking was cancelled), status 838 of the itinerary, universal locator code 840 for the itinerary, and customer contact information 842, 844.

Because some flight itineraries involve more than one destination (e.g. layovers), each flight segment is saved as a separate record 850 in flight leg table 810 and is associated with a common itinerary as seen, for example, in FIG. 8B. The flight leg information stored as records 850 in flight leg table 810, FIG. 8B, may include for example flight leg identifier 852, flight itinerary identifier 832, sequence 854 of the flight leg, airline information 856, flight number 858, departure airport 860, departure date and time 862, arrival airport 864, arrival date and time 866, and cabin type 868 for the flight leg. Similarly, information pertaining to the airfare of an itinerary is stored in airfare table 820 (FIG. 8C). Airfare information stored as records 880, FIG. 8C, in airfare table 820 may include airfare identifier 882, flight itinerary identifier 832, passenger type 884, number of passengers 886, base fare 888, taxes 890, and total airfare 892. For example, a flight from Atlanta, Ga. to Pittsburgh, Pa. with a layover in Charlotte, N.C. would result in one new record added to flight itinerary table 800, two new records added to flight leg table 810 (one for the Atlanta-Charlotte leg and one for the Charlotte-Pittsburgh leg), and a new record added to airfare table 820.

Once a reservation has been saved to online transactional database 124, FIG. 1, as a booking, the customer 115 may view the details of this booking via web-browser software 118 on network-enabled device 116 by connecting to web server 120 and requesting the customer's profile information. Web server 120 then has web application server 122 query online transaction database 124 for information regarding travel product purchases (e.g. bookings) associated with the customer. Online transactional database 124 supplies this information to web application server 122, which supplies it to web server 120. Referring ahead briefly to FIG. 16, a web page 1600 of an example customer profile displaying booked travel itineraries and rebate status information is shown. Web server 120 sends web page 1600, having information relating to booked itineraries associated with the customer, across communication network 112 to the web-enabled device 116 for display to the customer. Using web-browser software 118, the customer 115 may view the profile information provided in webpage 1600, FIG. 16, regarding air travel bookings of the customer.

The data stored in online transactional database 124 is periodically replicated in data warehouse database 126, as noted in step 230, FIG. 2. The replication process updates data warehouse database 126 by inserting new rows into tables 800, 810, 820 (FIGS. 8A-8C) of the data warehouse database 126 for new reservation bookings and updates existing records 830, 850, 880 in these booking tables 800, 810, 820 with information that has been modified for existing bookings. This replication allows the price comparison, step 240, FIG. 2, to query data warehouse database 126 instead of online transactional database 124. By replicating the information associated with booked itineraries in data warehouse database 126, the comparison module avoids impacting the availability of online transactional database 124 when conducting the comparison process as set forth in FIG. 3.

Figure 3:
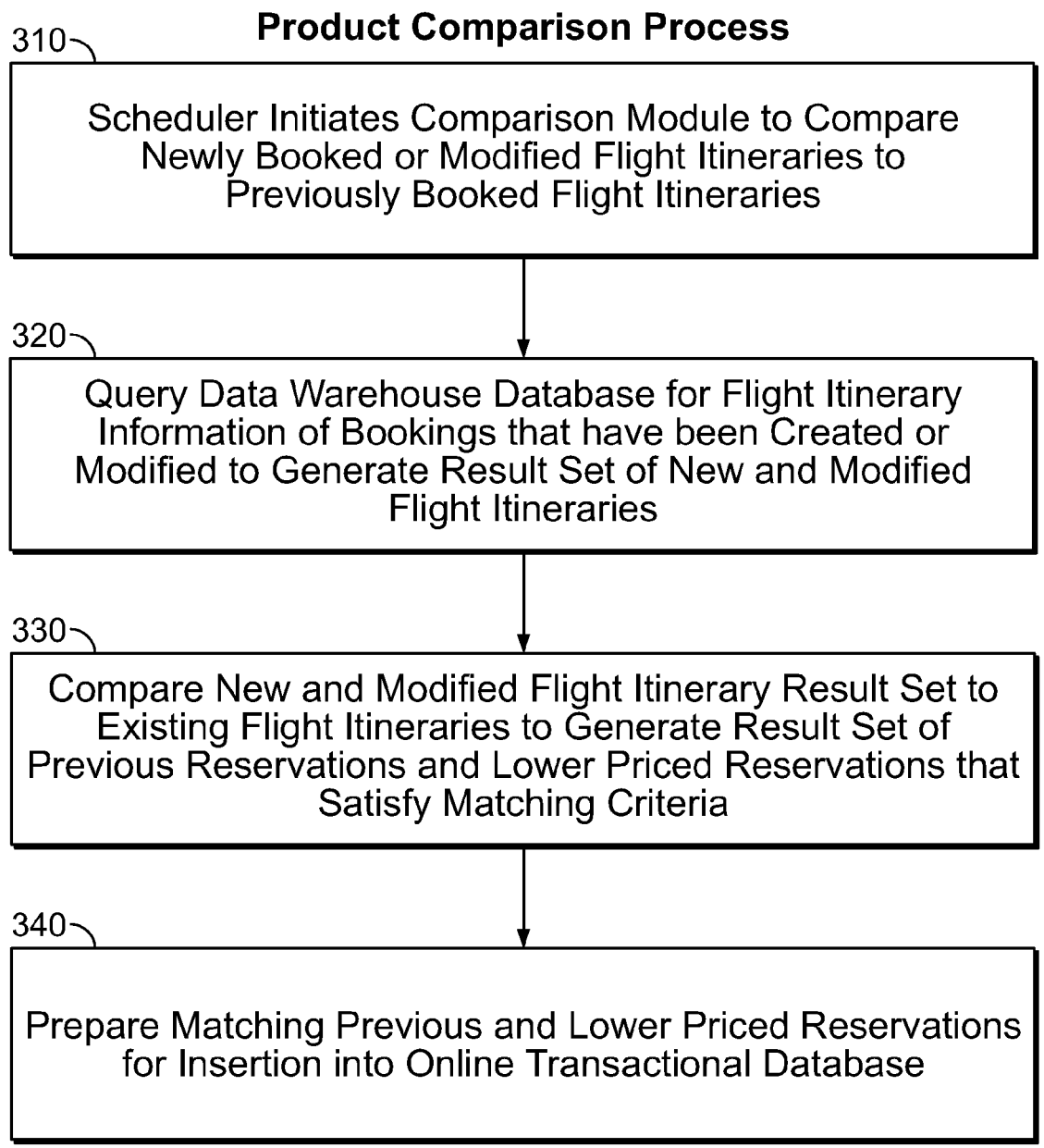
FIG. 3 is a flowchart of an example product comparison process.

Referring to FIG. 3, steps of an exemplary product comparison process are illustrated. In this example, air travel bookings are compared for the detection of lower priced air fares. In step 310, scheduler 134 of product administration application 130 initiates the operation of comparison module 136. As seen, in the product comparison process, comparison module 136 queries data warehouse database 126 for new and modified purchases. Comparison module 136 then matches the new and modified purchases with previous purchases based on a set of matching criteria. The comparison process identifies matching purchases where the subsequent purchase has a lower price. This comparison process results in a list of price detections, which may then be prepared for insertion as price detection records into databases 124, 126.

In particular, with continued reference to FIG. 3, in step 320, comparison module 136 of product administration system 102 queries data warehouse database 126 for newly created and modified flight itinerary bookings. Data warehouse database 126 may be queried for flight itinerary information from bookings that have been created or modified to generate a result set of new or modified flight itineraries. In step 330, comparison module 136 then compares the result set (for new and modified flight itinerary bookings) to existing flight itinerary bookings to generate a result set of previous bookings matching subsequent bookings having a lower priced airfare. Comparison module 136, for example, may match itineraries where air carrier, flight number, destinations, departure times, passenger type and cabin meet matching criteria. As will be understood, the matching criteria may be alternatively and selectively defined in accordance with system requirements or user preferences.

Referring ahead to FIG. 9, an example of a staging table 900 depicting information used by comparison module 136 during the product comparison process is shown. Staging table 900, as shown in the example in FIG. 9, includes two air travel itineraries that product administration application 130 identifies as matching (i.e. itineraries 'AAAAA' and 'ZZZZZ'). Booking information used by comparison module 136 is stored in staging table 900. Staging table 900, in this example, may be used to simplify the comparison process. Because booking information, in this example, is stored across multiple tables (e.g. 800, 810, 820) the use of staging table 900 allows for the collection in a single location, the information employed to match air travel itineraries and compare airfares. This simplifies the comparison process as comparison module 136 is able to look to a single location, for the booking information instead of multiple locations (or tables) across which booking information may be distributed. Alternatively, comparison module 136 may access multiple tables having booking information. Comparison module 136 inserts new staging records 910 and updates existing staging records 910 in staging table 900 representing itinerary information for bookings that have been created or modified respectively since the last time the product comparison process has occurred.

Air itinerary information is stored in staging table 900, FIG. 9. For example, information stored in staging table may include, but is not limited to: an itinerary identifier 832; an itinerary locator code 840; itinerary status 838; flight leg identifier 852; flight leg sequence number 854; air carrier 856; flight number 858; departure airport 860; departure date and time 862; arrival airport 864; arrival date and time 866; cabin type 868; passenger type 884; base fare 888; total fare 892; and reservation date 834. Because comparison module 136 may match air travel itineraries on the basis of various criteria such as flight leg, passenger type, and cabin type information, staging table 900 stores individual records 910 based on this information. For example, a flight from Atlanta, Ga. to Pittsburgh, Pa. with a layover in Charlotte, N.C. for an adult passenger and a child passenger would result in four records created in the staging table 900. The staging table records would include: a record of the Atlanta-Charlotte flight leg for the adult passenger; a record of the Atlanta-Charlotte flight leg for the child passenger; a record for the Charlotte-Pittsburgh flight leg for the adult passenger, and a record for the Charlotte-Pittsburgh flight leg for the child passenger. Similarly, a flight from Atlanta, Ga. to Chicago, Ill. with a first-class reservation for one customer and a coach-class reservation for another customer would result in two records in the staging table 900. One record would represent the first-class Atlanta-Chicago flight leg; the other record would represent the coach-class Atlanta-Chicago flight leg. Once staging table 900 is populated with the newly created and modified itinerary information, comparison module 136 further prepares the itinerary information for eventual matching.

Referring now to FIG. 10, an example of a unique flight leg table 1000 is shown. Unique flight leg table 1000, as seen in FIG. 10, depicts examples of unique flight legs drawn from staging table 900, FIG. 9. Unique flight legs receive a corresponding unique identification number 1020. When booking comparisons are made to determine if a match exists, the flight legs of new and modified bookings are compared to flight legs of existing bookings. This poses a computational challenge due to the combinational complexities that may arise. To simplify this, comparison module 136 creates a text representation of the flight legs for an itinerary, referred to as a route or route code. As seen, individual flight legs for booked air travel itineraries are assigned a unique value. Route codes may be formed as singular representations associated with each booked air travel itineraries are then created. The route code includes the unique values corresponding to the flight legs for a booked air travel itinerary. The route codes for booked air travel itineraries analyzed for rebate eligibility are compared with route codes associated with subsequently booked air travel itineraries.

Comparison module 136 extracts from staging table 900, FIG. 9, the unique flight legs of an itinerary and creates a unique flight leg record 1010 in the unique flight leg table 1000, FIG. 10, for each unique flight leg. In this example, a unique flight leg may be a flight leg having a unique flight number 858, cabin type 868, departure airport 860, departure date and time 862, arrival airport 864, and arrival date and time 866. The flight leg identified is unique because only one flight from a specific airline will depart from a specific airport at a specific date and time. Comparison module 136, then assigns each unique flight leg record 1010 a unique value 1020 (such as a unique number) and uses this unique value to create a textual, concatenated sequence representing the sequential flight legs of an itinerary. This is concatenated sequence of unique values forms a route code, which represents the flight legs for an itinerary.

For example, for an itinerary on Air Carrier Alpha comprised of flight segments from Atlanta, Ga. to Charlotte, N.C. on Jan. 1, 2009 at 12:00 PM, followed by a flight from Charlotte, N.C. to Pittsburgh, Pa. at 2:30 PM, followed by a flight from Pittsburgh, Pa. to Bangor, Me. at 5:30 PM, the flight legs may be assigned the following example unique values: 1138 (Atlanta-Charlotte), 2240 (Charlotte-Pittsburgh), and 30083 (Pittsburgh-Bangor). Comparison module 136, in this example, would construct the route code associated with this itinerary as: 1138.2240.30083. The same flight schedule on a different carrier, Air Carrier Beta, would receive different reference number unique values (e.g. 1139.2241.30084) despite having the same destinations and times. Because these flight legs occur on a different carrier, comparison module 136 considers each to be unique. Similarly, a passenger flying on Air Carrier Alpha starting from Mobile, Ala. but joining the Charlotte-Pittsburgh leg and Pittsburgh-Bangor leg would receive a different route code: 960.2240.30083 (with the Mobile-Charlotte leg receiving the unique value, 960). Finally, the same layovers but at different times would similarly receive unique values and, as a result, form different route codes. For example, a Jan. 1, 2009 flight on Air Carrier Alpha from Atlanta-Charlotte at 12:30 PM, Charlotte-Pittsburgh at 2:45 PM, and Pittsburgh-Bangor at 5:45 would receive its own unique route code: 1148.2250.30093.

By using a route code to compare itineraries, comparison module 136 and data warehouse database 126 avoid having to compare each flight leg of each new and modified booking with each flight leg of each existing booking. Instead, comparison module 136 simply matches records in itinerary comparison table 1100, FIG. 11, of data warehouse database 126 with the same route code 1120. FIG. 11 illustrates an exemplary itinerary comparison table 1100 used to compare air travel itinerary bookings. Once comparison module 136 constructs the route code from the information derived from unique flight leg table 1000, FIG. 10, comparison module 136, then creates a new record in itinerary comparison table 1100, FIG. 11, representing individual flight itineraries and stores the route code 1120 in the itinerary comparison table 1100. Itinerary comparison table 1100, in this example, depicts the concatenated route code built from information obtained from unique flight leg table 1000, FIG. 10. The records 1110 in itinerary comparison table 1100 are also populated with information extracted from staging table 900, FIG. 9, used to match itineraries. The information stored in itinerary comparison table 1100 includes, but is not limited to: an itinerary identifier 832; itinerary locator code 840; passenger type 884; the concatenated route code 1120; base fare 888; total fare 892; and the reservation date and time 834.

To find matching itineraries, comparison module 136 performs a query on itinerary comparison table 1100. In particular, a self-join query may be applied. The self-join query, in this example, is a database query that compares a database table with itself. In this example, comparison module 136 performs a self-join query on itinerary comparison table 1100 to match previous itinerary bookings with subsequent (lower-priced) itinerary bookings where the bookings have matching itinerary information and the subsequent booking has a lower-priced airfare. As a result, an example query for previous and subsequent bookings may be as follows: where the route code 1120 of the subsequent booking equals the route code of the previous booking; where the passenger type of the subsequent booking matches the passenger type 884 of the previous booking; where the base fare 888 of the subsequent booking is less than the base fare of the previous booking; and where the reservation date 834 of the subsequent booking occurred after the reservation date of the earlier booking. Because the route code 1120 inherently includes information regarding the departure time and location, matching itineraries on the basis of route codes inherently includes matching itineraries on the basis of information regarding time and location. The records in the result set produced by this query represent previous bookings matched with subsequent bookings having a lower airfare price.

Comparison module 136, FIG. 1, then uses the result set produced to insert new records into product comparison results table 1200, FIG. 12, whereby comparison results table stores information regarding the previous booking and the matching subsequent booking having a lower priced airfare. FIG. 12 illustrates an example of a product comparison results table 1200 depicting matching products with different prices. In the example shown in FIG. 12, results of comparing flight itinerary reservations are stored in comparison results table 1200 including a result record 1210 depicting matching itineraries ('AAAAA' and 'ZZZZZ'). Comparison results table 1200 in this example, includes, but is not limited to the following fields for a previous booking and a subsequent booking: an itinerary identifier 832A, 832B; an airfare identifier 882A, 882B; a locator code 840A, 840B; the passenger type 884A, 884B; the cabin type 868A, 868B; the base fare 888A, 888B; the total fare 892A, 892B; and the departure date and time for the previous booking 862A.

Referring back to FIG. 3, step 340 in the product comparison process, in this example, involves preparing the comparison results for insertion into online transactional database 124. In step 340 comparison module 136 creates a text file containing the information of the comparison results table 1200, FIG. 12. Comparison module 136, FIG. 1, then places this text file 133A, FIG. 1 on file server 132 for access by data migration module 140. Once the text file 133A containing the most recent price detection information has been placed on file server 132, comparison module 136 completes the product comparison process.

Referring back to FIG. 2, after the comparison of previous bookings with subsequent bookings is performed in step 240, the price detection process proceeds to step 250 in which data of online transactional database 124 is synchronized with data stored at external GDS 108. The synchronization process provides a check such that up-to-date information is examined and any price detections found are checked for accuracy.

In this example, because booked itinerary information is stored at external GDS 108, FIG. 1, and can be directly modified by airlines themselves, the synchronization of data checks that the product administration system 102 is working with up-to-date information regarding booked air travel itineraries. For example, changes made by a customer to an air travel itinerary previously booked by the customer may be found to invalidate any subsequently found price detections associated with that itinerary. If a price detection is invalidated, the customer may be no longer eligible to receive a rebate from the price detection. This is because changes to the air travel itinerary may fail to satisfy the matching criteria originally used to recognize a subsequently booked matching itinerary having a lower priced air fare.

For example, comparison module 136 may recognize a price detection with Booking A matching Booking B, which has a lower priced airfare. However, the synchronization of booking data from external GDS database 152 with the stored booking data in online transactional database 124 (as described in detail with reference to FIG. 4) might reveal that the customer who purchased Booking A changed the flight itinerary and will now be traveling at a different time. Because the departure time for Booking A was changed, Booking A no longer matches Booking B. As a result, the customer of Booking A would no longer be eligible for a rebate and the price detection between Booking A and Booking B would no longer be valid. Thus, in this example, the synchronization process (FIG. 4) may be used to monitor for occurrences of itinerary cancellations and modifications to itineraries that may invalidate a price detection. Where cancellations or modifications made by the customer occur for itineraries with pending price detections, synchronization module 138 may invalidate the associated price detection records 1300, FIG. 13.

Figure 4:
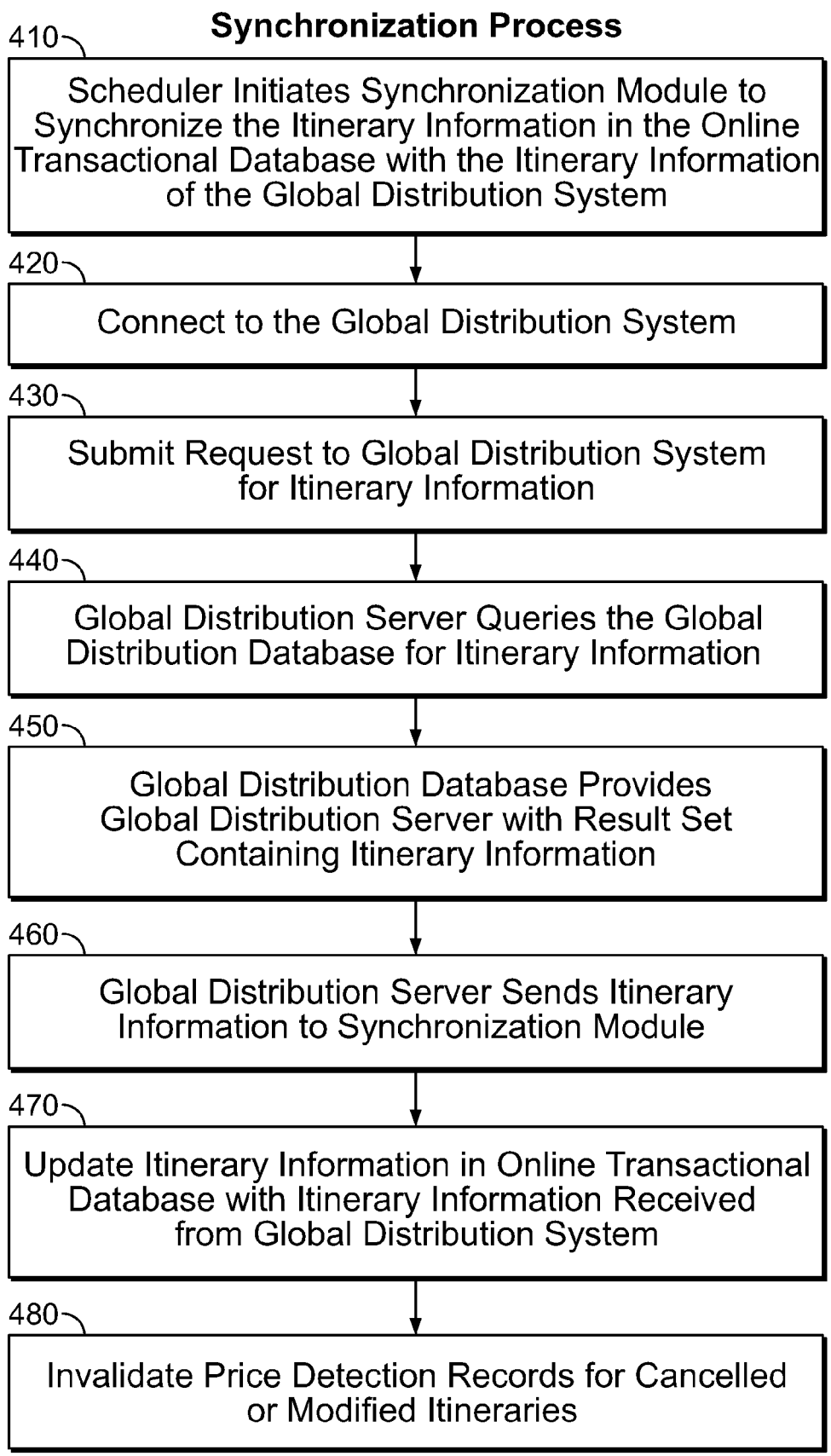
FIG. 4 is a flowchart of an example synchronization process.

Referring specifically to FIG. 4, scheduler 134 initiates synchronization module 138 to perform the synchronization process in step 410. In particular, scheduler 134 initiates synchronization module 138 to synchronize booked itinerary information in online transactional database 124 with booked itinerary information of external GDS 108. In step 420, synchronization module 138 connects to external GDS 108 via communication network 112. In step 430, synchronization module 138 then submits a query request to GDS server 150 for the booked itinerary information held by online transactional database 124. In step 440, GDS server 150 then queries the GDS data storage database 152 for this information. GDS data storage database 152 provides GDS server 150 with the results of the query in 450. GDS server 150 then sends these results to synchronization module 138 of product administration application 130 via communication network 112 in step 460. Synchronization module 138 then updates, in step 470, the records 830, 850, 880 (FIGS. 8A-8C) associated with booked itineraries in tables 800, 810, 820 in online transactional database 124 to reflect any changes to the itineraries existing in the data received from the external GDS 108. In step 480, synchronization module 138 invalidates any price detection records 1310 (FIG. 13) for itineraries that have been modified as determined by the GDS synchronization process. Once itinerary changes, if any, have been applied to the itineraries in online transactional database and any price detection records appropriately invalidated, the synchronization process portion of the price detector process is completed.

Referring back to the price detection process of FIG. 2, in step 260, the creation of price detection records is performed. Generally, this data migration that is performed (and described further with reference to FIG. 5) uses the results of the product comparison process (FIG. 3) to create new records in price detection table 1300, FIG. 13. It should be noted, that where information is not stored in multiple databases, the data migration process of FIG. 5 may not be performed and the records created in the price comparison results table (FIG. 12) may be employed.

Figure 5:
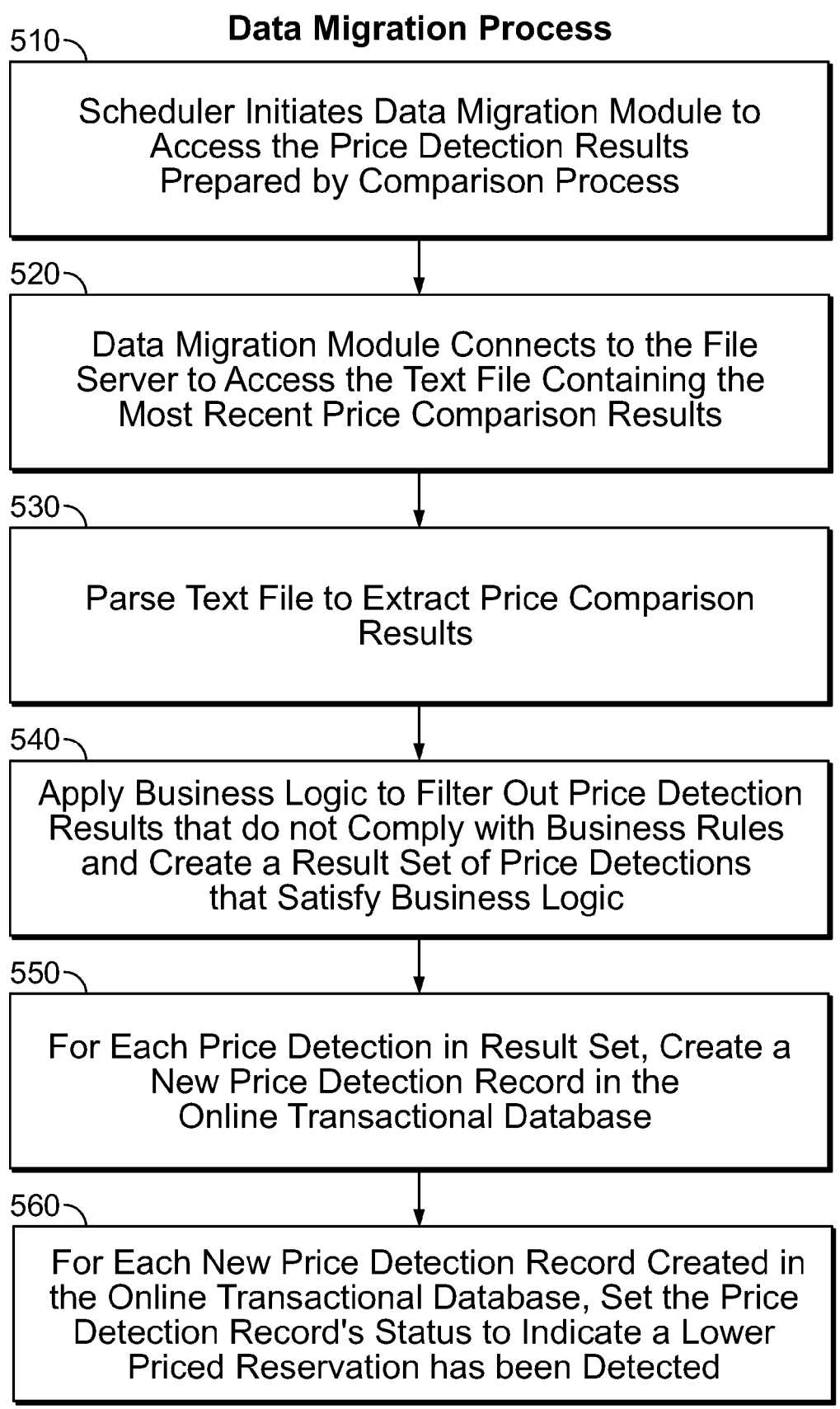
FIG. 5 is a flowchart of an example data migration process.

Referring now to FIG. 5, exemplary steps of the data migration process are provided. In step 310, scheduler 134 of product administration application 130 initiates data migration module 140 to perform the data migration process and access the price detection results prepared by comparison module 136 in comparison process (FIG. 3). Data migration module 140 connects to file server 132 in order to access the text file 133A containing the price comparison results in step 520. Data migration module 140 then parses this price detection text file 133A, FIG. 1, to extract the price detection information from the text file of price comparison results in step 530. In step 540, data migration module 140 processes this price detection information to apply further business logic to the comparison results. The business logic applied, in this example, may include rules used to exclude or include specific price comparison results. Application of the computer-implemented business rules may, for instance, prevent the issuance of a rebate if the price difference in matching booked itineraries does not reach a minimum threshold value or cap a rebate amount at a maximum threshold value. For example, business logic stored at data migration module 140 may require the exclusion of price detections where the difference in airfare prices is less than a minimum threshold value (e.g. no less than $5.00) or cap a rebate amount at a maximum threshold value (e.g. no greater than $250.00). Additionally, the business logic may include one or more rules to exclude price detections where the refundability status of the itineraries for a price detection is not the same—for example, where one air travel itinerary of the price detection is refundable and the matching air travel itinerary of the price detection is non-refundable. The business logic may, for example, be embodied in data migration module 140 as program instructions.

Once data migration module 140 applies the business logic, valid comparison results remain in the result set and are ready for insertion into online transactional database 124 as price detection records 1310 (FIG. 13). Price detection records 1310 are stored in price detection table 1300, FIG. 13, at online transactional database 124. In this example, price detection table 1300 includes, but is not limited to: a unique identifier 1320; a reference 882 to the airfare record of the airfare table 820 (FIG. 8C) for the itinerary to which the price detection applies; the lower airfare amount 1330, FIG. 13; locator code 1340 for the itinerary with the lower airfare; the status 1350 of the price detection record 1310; and the status date 1360 for the price detection record 1310. For new, valid, comparison results, data migration module 140 inserts new records 1310 into price detection table 1300, stored in online transactional database 124, in step 550, FIG. 5. In this example, data migration module 140 sets the status of the records as "D" to indicate that a price difference has been detected when inserting new price detection records 1310, in step 560.

In this example, each price detection record 1310, FIG. 13, has a status field 1350 that indicates the status of the price detection. Price detection table 1300 provides different status types, for example, detected ("D"), notified ("N"), redeemed ("R"), and expired ("E") records. Additionally, in this example, instead of simply changing the status 1350, FIG. 13, of the price detection record 1310 a new price detection record may be inserted into the price detection table and a status date 1360 is set to indicate that the new price detection record 1310 is the most current and up-to-date price detection record for the associated itinerary and airfare records. This may be performed in order to provide historical data for analysis purposes regarding the life of price detection records 1310. Thus, price detections that are detected, that have been issued as notifications to customers, and that have been redeemed will result in three separate records in price detection table 1300. The first record indicates that a lower-priced airfare has been detected (status "D") on a matching itinerary that was subsequently booked. The second record indicates that the customer 115 has been notified of the price detection and is eligible to receive a rebate (status "N"). The third record indicates that the customer 115 has redeemed the price detection and is entitled to a rebate (status "R").

Similarly, a price detection record 1310, FIG. 13, that is ultimately invalidated may result in two records in price detection table 1300. The first price detection record indicates in status field 1350 that a matching itinerary with a subsequently booked lower-priced airfare has been detected (status "D"). The second price detection record indicates in status field 1350 that the price detection has expired and is no longer valid (status "E"). Because multiple price detection records are stored for a single itinerary, the most recent price detection record is identified by the status date 1350, which indicates the most recent status for a price detection record associated with an itinerary. It should be noted that although storing multiple price detection records may be performed in this example, alternative approaches may be performed as well. For instance, an approach that utilizes only one price detection record for which the status field is simply updated may alternatively be performed.

Data migration process, as set forth in FIG. 5, results in itinerary records 830, FIG. 8A, of online transactional database 124 and their associated airfare records 880, FIG. 8C, being associated with a price detection record 1310, FIG. 13. Price detection records 1310, represent a rebate for which a customer 115 may be eligible. Once the itinerary of a customer has associated price detection records, web application server 122 may query online transactional database 124 for information regarding these price detections, whereby web server 120 may then display the price detection information in a webpage 1600, FIG. 16 to inform the customer of any eligible rebates. For example, once the price detection records 1310 (FIG. 13) are created in online transactional database 124, the customer 115 may access web server 120 with a network-enabled device 116 via communication network 112 to view web page 1600, FIG. 16, showing air travel itinerary bookings and rebate status information for the customer. The profile of the customer displayed on web page 1600 may show the current status of the bookings, including: itineraries being monitored 1610 for lower prices; itineraries with price detections 1620 eligible for a refund; and itineraries for which the refund has been redeemed 1630.

Referring back to FIG. 2, step 270 of price detection process involves notifying a customer that the subsequent booking of a matching flight itinerary having a lower price has been detected. In general, notification module 142 informs customers that the purchase of a matching travel product has been detected with a lower price resulting in the customers being eligible for a rebate. Notification module 142 generates and sends a notification message regarding the rebate amount. Once a customer is notified, notification module 142 then updates the status 1350 of the price detection record 1310, FIG. 13, to indicate that the customer has been informed of the price detection and the eligibility of a price rebate. In this example, notification module 142 notifies customers of matching itineraries that were purchased by others at lower-priced airfares through the use of email technology, although alternative notification approaches may selectively be employed.

Figure 6:
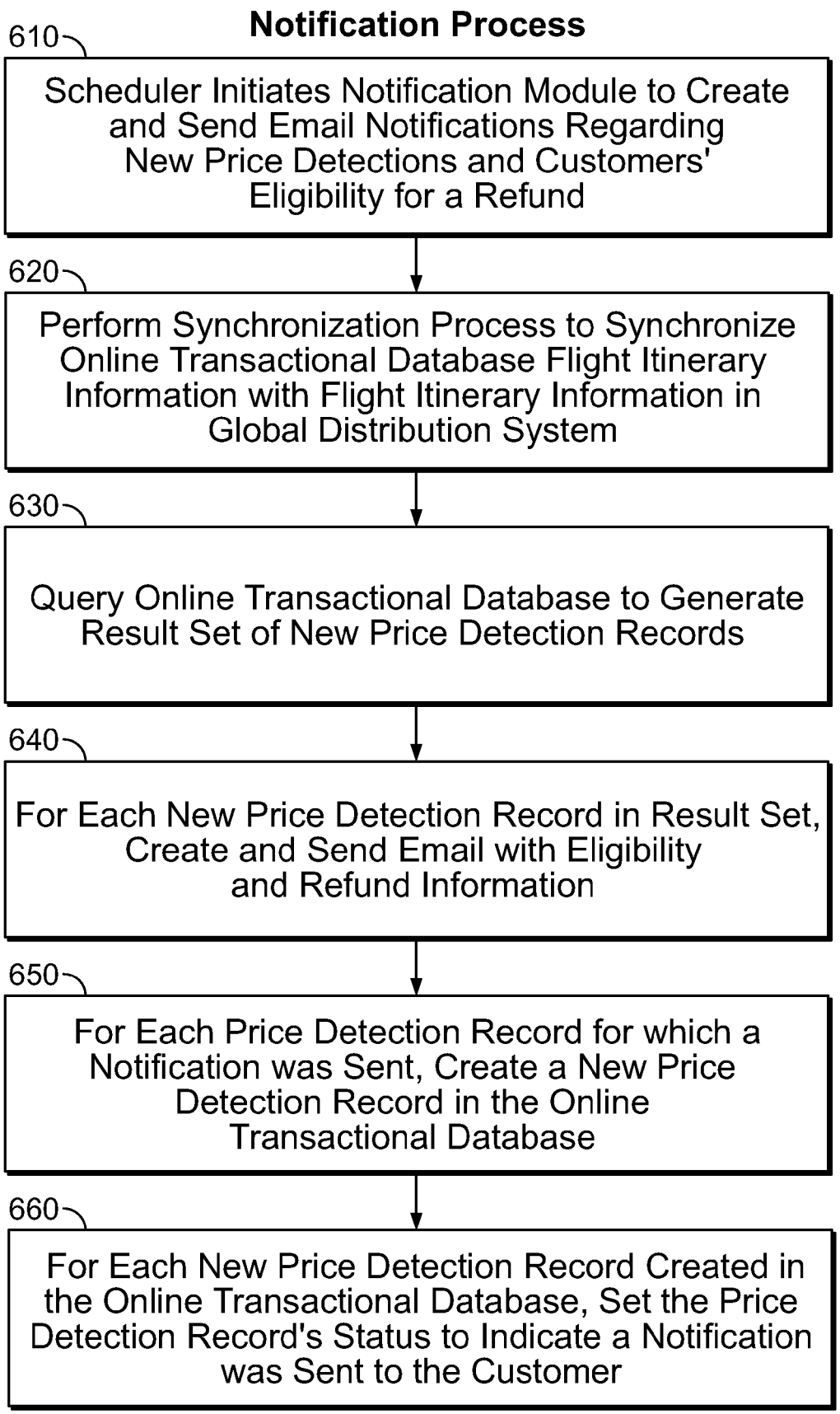
FIG. 6 is a flowchart of an example notification process.

Referring specifically to FIG. 6, in step 610, scheduler 134 of product administration application 130 initiates the notification module 142 to perform the notification process. In step 620, the itinerary information stored in online transactional database 124 is again synchronized with the itinerary information of the external GDS 108. This synchronization check is again performed to be sure that the itinerary has not been cancelled or modified by the customer before notification module 142 sends out notification informing the customer of the eligibility for a rebate. Thus, notification module 142 initiates synchronization module 138 to perform the synchronization process to update the flight itinerary information and invalidate pending price detection records if their associated itineraries have been cancelled or modified by the customer. To indicate that a price detection record 1310, FIG. 13, has been invalidated, a new price detection record is created in online transactional database 124 and the status 1350 of this new price detection record 1310 is set to "E" to indicate that the eligibility for a rebate has expired. The status date 1360 is also set to the current date indicating that this new price detection record 1310 is the most recent price detection record for the itinerary and airfare records.

In step 630, FIG. 6, online transactional database 124 is queried by notification module 142 for all price detection records 1310 that have not had notifications sent to the appropriate customers. In particular, notification module 142 queries online transactional database 124 for price detection records 1310 whose status 1350 is marked as "D"—the status which indicates that a matching itinerary subsequently booked at a lower price has been detected. Notification module 142 receives a result set as a result of this query representing all price detection records with a status of "D". For each price detection record in this result set, notification module 142, in step 640, FIG. 6, creates and sends an email to the corresponding customer, which includes information regarding the itinerary of the customer, the lower price discovered by product administration system 102, and the rebate amount for which the customer is eligible. Notification module 142 sends this email to email server 154 accessible by the customer 115 via communication network 112. The customer 115 may then use network-enabled device 116 having email software 156 installed to connect to email server 154 via communication network 112 and download the email describing the rebate eligibility.

After notification module 142 has sent the email advising of rebate eligibility, in step 650, FIG. 6, notification module 142 creates a new price detection record 1310, FIG. 13, in price detection table 1100 stored at online transactional database 124. In step 660, FIG. 6, notification module 142 sets the status 1350 of this new price detection record to "N" indicating that the customer has been notified of the price detection and the eligibility for a rebate. Notification module 142 also sets the status date 1360, FIG. 13, of the new price detection record to the current date (at which notification was made) indicating that this new price detection record is the most recent price detection record 1310 for the itinerary and airfare records.

Referring again to FIG. 2, step 280 in the price detection process identifies the payment process in which rebate amounts are sent to customers eligible for a rebate. In general, the payment process collects newly redeemed price detections and processes this information to provide customers with a refunded rebate amount. Once a customer's flight departs, the customer is determined to have redeemed the eligible rebates associated with the flight itinerary. In this example, a price detection is redeemed once the departure date for the itinerary has passed. This provides that a customer has not cancelled or modified the itinerary before receiving a rebate. Payment records may also be created for bookkeeping and accounting purposes.

Product administration application 130 of product administration system 102 calculates rebate amounts from price differences between an airfare price for a previously booked air travel itinerary and a lower airfare price for a subsequently booked air travel itinerary. In one example, a rebate amount may be found as a difference between the base airfare price 888 of a previously booked air travel itinerary, the lower base airfare price 1330, FIG. 13, of the subsequently booked air travel itinerary. The rebate amount, for example, may be multiplied by the number of passengers 886, FIG. 8C, for the itinerary. For instance, if the number of passengers totaled two passengers, and the difference between the base airfare 888 for the previously booked air travel itinerary and the lower base airfare price 1330 for the subsequently booked itinerary totaled $50.00, the rebate amount would equal $100.00 ($50.00×two passengers=$100.00 rebate amount). In this particular example, if there is only one passenger, the rebate amount would equal $50.00 ($50.00×one passenger=$50.00).

Additionally, in this example, appropriate modules of product administration application 130 may calculate the rebate amount at particular instances where the rebate amount information may be needed. The rebate amount may be computed by querying online transactional database 124 or data warehouse database 126 for the most recent price detection record 1310, FIG. 8A, and airfare record 880, FIG. 8C, of a given booked air travel itinerary. The lower airfare price 116 of price detection record 1310 is subtracted from base airfare price 888 of airfare record 880. This value may then, for example, be multiplied by the number of passengers to arrive at a rebate amount. When notification module 142 sends a notification message to a customer 115, notification module 142 may compute a rebate amount and include the rebate amount as part of the notification message. Payment module 144 may also compute a rebate amount for redeemed price detection records during the creation of price detection redemption text file 133B and the creation of payment records 1410, FIG. 14. In another example, web application server 122 may compute a rebate amount for display in web page 1600, FIG. 16, when web server 120 sends web page 1600 depicting customer profile information. In alternative embodiments, rebate amount may be computed only once and stored in databases 124, 126 or other suitable memory location. Databases 124, 126 may be queried for rebate amounts in such instances where rebate amounts for particular air travel itineraries are needed.

Referring now to FIG. 7, the payment process for the example rebate processing system is illustrated. In this example, payment process involves both automatic and manual processing of rebate information. Redeemed price detection records are automatically collected by product administration system 102, and the price detection and customer information is made available to a third-party rebate provider 164, which is supplied with the information, finds, and fees necessary to process the redeemed price detections and deliver an appropriate rebate amount to the individual customers. In step 705, scheduler 132 initiates payment module 144 to query online transactional database 124 for itineraries for which the departure date has passed to create a result set of redeemed price detection records. For each redeemed price detection record 1310 in this result set, payment module 144 then creates a new price detection record 1310, FIG. 13, in price detection table 1300 in online transactional database 124 in step 710. In step 715, payment module 144 sets the status of each new record to "R" and sets the status date 1360, FIG. 13, to the current date indicating that the price detection for the associated flight itinerary and airfare has been redeemed. Payment module 144 then replicates these redeemed price detection records in a similar price detection table in data warehouse database 126 in step 720.

Payment module 144, in step 725, queries data warehouse database 126 creating a result set of redeemed price detection records. Payment module 144 then, in step 730, creates a text file containing the customer and rebate information of the redeemed price detection records in this result set. When creating this price detection redemption text file, payment module 144 formats the file in accordance with the formatting specifications set forth by third-party rebate provider 164 so that third-party rebate provider may import this file into its own system for processing. In step 740, payment module 144 places price detection redemption text file 133B on file server 132 so that it may be accessed by network enabled device 116 associated with the third-party rebate provider 164 via communication network 112.

In addition to creating the price detection redemption text file 133B, payment module 144 also creates payment records 1410, FIG. 14, in a price detection payment table 1400 of the credit processing database 160. As seen in FIG. 14, payment records 1410 of price detection payment table 1400 have information regarding rebate payments. In this example, information provided in payment records 1410 may include but is not limited to: unique identifier for the payment record 1420; price protection identifier 1430 for which payment record 1410 is associated; locator code 840A associated with the earlier booked—itinerary for which the price detection applies; locator code 840B associated with the subsequently booked matching itinerary having a lower priced airfare; rebate payment amount 1440 equal to the difference between the previous airfare price and the lower airfare price for the subsequently booked itinerary; the status 1350 of the price detection; and the status date 1360. In step 750, payment module 144 creates payment records 1410 in price detection payment table 1400 in credit processing database 160 for each redeemed price detection record to keep track of payment information. In step 755, these price detection payment records 1410 are replicated in a price detection payment table 1400, FIG. 14, of data warehouse database 126 for use in general business reporting and analysis operations. The payment records include payment information regarding rebates sent to customers. In step 760, payment records may also be created in accounts payable database 162 for accounting and bookkeeping purposes.

Once the price detection payment records 1410, FIG. 14, are inserted into the credit processing database 160, in step 750, FIG. 7, a single rebate check, for example, may be written for the sum of the rebate amounts for these newly redeemed price detection records. The check is then sent, in step 765, to the third-party rebate provider 114, which uses this check to create individual rebate checks for customers. Third-party rebate provider 164 uses a network-enabled device 116 to access file server 132, download the price detection redemption text file 133B, and process the price detection information to send appropriate rebate amounts to customers in step 770. Accounts payable database 162 is used to provide the third-party rebate provider 164 with the fees associated with the rebate processing service.

The foregoing description of the preferred embodiments of the invention have been presented for purposes of illustration and description, and are not intended to be exhaustive or to limit the invention the precise forms disclosed. The descriptions were selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A computer-implemented method for automatically determining rebate eligibility for booked air travel itineraries comprising:
storing booking information associated with a first booked air travel itinerary in an electronic database maintained in a memory of a server, said first booked air travel itinerary booked at a first airfare price;
storing booking information associated with subsequently booked air travel itineraries in the electronic database, said subsequently booked air travel itineraries having corresponding airfare prices;
comparing the booking information associated with the first booked air travel itinerary with the booking information associated with the subsequently booked air travel itineraries using a product administration application executed by a processor;
determining that the first booked air travel itinerary matches one of the subsequently booked air travel itineraries based on a set of matching criteria using the product administration application executed by the processor;
determining that the subsequently booked air travel itinerary was booked at a lower airfare price than the first airfare price for the first booked air travel itinerary using the product administration application executed by the processor; and
calculating a rebate amount from a price difference between the first airfare price and the lower airfare price associated with the subsequently booked air travel itinerary using the product administration application executed by the processor.

2. The computer-implemented method of claim 1 wherein the step of comparing is repeated at periodic intervals until a predetermined event occurs.

3. The computer-implemented method of claim 2 wherein the predetermined event is a departure date for the first booked air travel itinerary.

4. The computer-implemented method of claim 1 further comprising synchronizing the booking information stored in the electronic database with corresponding booking information stored in a second memory of an external system.

5. The computer-implemented method of claim 4 wherein the external system is a global distribution system.

6. The computer-implemented method of claim 1 further comprising generating and sending a notification message regarding the rebate amount using the product administration application executed by the processor.

7. The computer-implemented method of claim 1 further comprising applying computer-implemented rules using the product administration application executed by the processor to include and exclude instances where the first booked air travel itinerary matches a subsequently booked air travel itinerary to establish rebate eligibility.

8. The computer-implemented method of claim 7 wherein the step of applying computer-implemented rules further comprises:

applying a maximum threshold value and a minimum threshold value for the price difference between the first airfare price and the lower airfare price;

capping the rebate amount at the maximum threshold value; and preventing the issuance of the rebate amount if the price difference does not reach the minimum threshold value.

9. The computer-implemented method of claim 1 further comprising:

determining that the first booked air travel itinerary has been cancelled by a customer; and rendering the first booked air travel itinerary ineligible for a rebate in response to the determination that the first booked air travel itinerary was cancelled by the customer.

10. The computer-implemented method of claim 1 wherein the step of comparing further comprises:

assigning individual flight legs for the first and subsequently booked air travel itineraries a unique value;

creating a singular representation associated with each of the first and subsequently booked air travel itineraries, said singular representation comprising the unique values corresponding to the flight legs; and comparing the singular representation associated with the first booked air travel itinerary with the singular representation associated with the subsequently booked air travel itineraries.

11. The computer-implemented method of claim 1 wherein the matching criteria comprises: (a) airline data, (b) departure date and time data, and (c) departure airport data.

12. The computer-implemented method of claim 11 wherein the matching criteria further comprises: (d) cabin class data, and (e) passenger type data.

13. The computer-implemented method of claim 1 further comprising:

providing a database result set in response to the determination that the first booked air travel itinerary matches one of the subsequently booked air travel itineraries; and storing elements of the database result set in the electronic database.

14. The computer-implemented method of claim 13 wherein the step of comparing further comprises collecting the booking information associated with the first and subsequently booked air travel itineraries in a staging table of the electronic database.

15. A computer-implemented method for automatically determining rebate eligibility for purchased products comprising:

storing in an electronic database maintained in a memory of a server associated with an on-line purchasing system, purchase information associated with a first purchased product purchased at a first purchase price;

storing in the electronic database, purchase information associated with subsequently purchased products purchased at corresponding purchase prices;

comparing the purchase information associated with the first purchased product with the purchase information associated with the subsequently purchased products using a product administration application executed by a processor;

determining that the first purchased product matches one of the subsequently purchased products based on a set of matching criteria using the product administration application executed by the processor;

determining that the subsequently purchased product was purchased at a lower purchase price than the first purchase price for the first purchased product using the product administration application executed by the processor; and calculating a rebate amount from a price difference between the first purchase price for the first purchased product and the lower purchase price for the subsequently purchased product using the product administration application executed by the processor.

16. The computer-implemented method of claim 15 further comprising synchronizing the purchase information stored in the electronic database with corresponding purchase information stored in a second memory of an external system.

17. The computer-implemented method of claim 15 further comprising generating and sending a notification message regarding the rebate amount using the product administration application executed by the processor.

18. The computer-implemented method of claim 15 further comprising:

applying a maximum threshold value and a minimum threshold value for the price difference between the first purchase price for the first purchased product and the lower purchase price for the matching subsequently purchased product;

capping the rebate amount at the maximum threshold value; and preventing the issuance of the rebate amount if the price difference does not reach the minimum threshold value.

19. The computer-implemented method of claim 15 further comprising:

determining that the first purchased product has been cancelled by a customer; and rendering the first purchased product ineligible for a rebate in response to the determination that the first purchased product was cancelled by the customer.

20. The computer-implemented method of claim 15 wherein the step of comparing is repeated at periodic intervals until a predetermined event occurs if no subsequently purchased products having lower purchase prices than the first purchase price for the first purchased product are found.

21. A computer-implemented system for automatically determining rebate eligibility for booked air travel itineraries comprising:

a purchasing system including an electronic database maintained in a memory of a server that stores booking information associated with a first booked air travel itinerary and that stores booking information associated with subsequently booked air travel itineraries, said first booked air travel itinerary booked at a first airfare price and said subsequently booked air travel itineraries having corresponding airfare prices; and a product administration system including at least one second server including a second memory and a processor, the product administration system in communication with the purchasing system and maintaining a software application executed by the processor and configured to interact with the electronic database to:

compare the booking information associated with the first booked air travel itinerary with the booking information associated with the subsequently booked air travel itineraries, determine that the first booked air travel itinerary matches one of the subsequently booked air travel itineraries based on a set of matching criteria, and determine that the subsequently booked air travel itinerary was booked at a lower airfare price than the first airfare price for the first booked air travel itinerary; and calculate a rebate amount from a price difference between the first airfare price and the lower airfare price associated with the subsequently booked air travel itinerary.

22. The computer-implemented system of claim 21 wherein the software application is configured to repeatedly compare the booking information associated with the first booked air travel itinerary with the booking information associated with the subsequently booked air travel itineraries at periodic intervals until a predetermined event occurs.

23. The computer-implemented system of claim 22 wherein the predetermined event is a departure date for the first booked air travel itinerary.

24. The computer-implemented system of claim 21 wherein the software application is configured to synchronize the booking information stored in the database with corresponding booking information stored in an external system.

25. The computer-implemented system of claim 24 wherein the external system is a global distribution system.

26. The computer-implemented system of claim 21 wherein the software application is configured to automatically generate and send a notification message regarding the rebate amount for receipt by a network-enabled device.

27. The computer-implemented system of claim 21 wherein the software application is configured to apply computer-implemented rules to include and exclude instances where the first booked air travel itinerary matches a subsequently booked air travel itinerary to establish rebate eligibility.

28. The computer-implemented system of claim 27 wherein the computer-implemented rules include a maximum threshold value and a minimum threshold value for the price difference between the first airfare price and the lower airfare price, and wherein the software application is configured to apply the computer implemented rules such that the rebate amount is capped at the maximum threshold price and issuance of the rebate amount is prevented if the price difference does not reach the minimum threshold value.

29. The computer-implemented system of claim 21 wherein the software application is configured to determine that the first booked air travel itinerary has been cancelled by a customer and render the first booked air travel itinerary ineligible for a rebate in response to the determination that the first booked air travel itinerary was cancelled by the customer.

30. The computer-implemented system of claim 21 wherein the software application is further configured to:
assign individual flight legs for the first and subsequently booked air travel itineraries a unique value;
create a singular representation associated with each of the first and subsequently booked air travel itineraries, said singular representation comprising unique values corresponding to the flight legs; and
compare the singular representation associated with the first booked air travel itinerary with the singular representation associated with the subsequently booked air travel itineraries.

31. The computer-implemented system of claim 21 wherein the matching criteria comprises: (a) airline data, (b) departure date and time data, and (c) departure airport data.

32. The computer-implemented system of claim 31 wherein the matching criteria further comprises: (d) cabin class data, and (e) passenger type data.

33. The computer-implemented system of claim 21 wherein the software application is further configured to provide a database result set in response to the determination that the first booked air travel itinerary matches one of the subsequently booked air travel itineraries and the database stores elements of the database result set.

34. The computer-implemented system of claim 33 wherein the software application is configured to collect the booking information associated with the first and subsequently booked air travel itineraries for storage in a staging table of the database.

35. A computer-implemented system for automatically determining rebate eligibility for purchased products comprising:
a purchasing system including an electronic database maintained in a memory of a server that stores purchase information associated with a first purchased product and stores purchase information associated with subsequently purchased products, said first purchased product purchased at a first purchase price and said subsequently purchased products purchased at corresponding purchase prices; and
a product administration system including at least one server including a second memory and a processor, the product administration system in communication with the purchasing system and maintaining a software application executed by the processor and configured to interact with the electronic database to:
compare the purchase information associated with the first purchased product with the purchase information associated with the subsequently purchased products, determine that the first purchased product matches one of the subsequently purchased products based on a set of matching criteria,
determine that the subsequently purchased product was purchased at a lower purchase price than the first purchase price for the first purchased product; and
calculate a rebate amount from a price difference between the first purchase price for the first purchased product and the lower purchase price for the subsequently purchased product.

36. The computer-implemented system of claim 35 wherein the software application is configured to synchronize the purchase information stored in the database with corresponding purchase information stored in an external system.

37. The computer-implemented system of claim 35 wherein the software application is configured to generate and send a notification message regarding the rebate amount.

38. The computer-implemented system of claim 35 wherein the software application is configured to apply computer-implemented rules to include and exclude instances where the first purchased product matches a subsequently purchased product to establish rebate eligibility.

39. The computer-implemented system of claim 35 wherein the software application is configured to determine that the first purchased product has been cancelled by a customer and render the first purchased product ineligible for the rebate amount in response to the determination that the first purchased product was cancelled by the customer.

40. The computer-implemented system of claim 35 wherein the software application is configured to repeatedly compare the purchase information associated with the first purchased product with the purchase information associated with the subsequently purchased products at periodic intervals until a predetermined event occurs if no subsequently purchased products having lower purchase prices than the first purchase price for the first purchased product are found.

* * * * *